(12) United States Patent
Imrey et al.

(10) Patent No.: US 8,510,189 B2
(45) Date of Patent: *Aug. 13, 2013

(54) METHOD FOR FUTURE PAYMENT TRANSACTIONS

(75) Inventors: G. Christopher Imrey, Newport Beach, CA (US); William J. House, Corona del Mar, CA (US); David A. Hodgkins, Corona del Mar, CA (US)

(73) Assignee: Apollo Enterprise Solutions, Inc., Long Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/925,312

(22) Filed: Oct. 18, 2010

(65) Prior Publication Data

US 2011/0040687 A1   Feb. 17, 2011

Related U.S. Application Data

(63) Continuation of application No. 11/372,850, filed on Mar. 9, 2006, now Pat. No. 7,818,229, which is a continuation-in-part of application No. 11/256,406, filed on Oct. 19, 2005, and a continuation-in-part of application No. 11/256,405, filed on Oct. 19, 2005, which is a continuation-in-part of application No. 11/256,404, filed on Oct. 19, 2005.

(60) Provisional application No. 60/620,131, filed on Oct. 19, 2004.

(51) Int. Cl.
*G06Q 40/00* (2012.01)

(52) U.S. Cl.
USPC .............................................. 705/35; 705/40

(58) Field of Classification Search
USPC ...................................................... 705/35, 40
See application file for complete search history.

(56) References Cited

U.S. PATENT DOCUMENTS

| | | | | |
|---|---|---|---|---|
| 5,220,501 | A * | 6/1993 | Lawlor et al. | 705/40 |
| 2003/0055783 | A1 * | 3/2003 | Cataline et al. | 705/40 |
| 2003/0110129 | A1 * | 6/2003 | Frazier et al. | 705/40 |
| 2003/0187796 | A1 * | 10/2003 | Swift et al. | 705/45 |

OTHER PUBLICATIONS

Grunewald, R. (1995), Banking from home. The Region, 9, 15-15. Retrieved Dec. 13, 2012.*

* cited by examiner

*Primary Examiner* — Kito R Robinson
(74) *Attorney, Agent, or Firm* — Smyrski Law Group, A P.C.

(57) ABSTRACT

A method for the online modification, submission and approval processing of a future payment request to afford a user the ability to renegotiate established loan agreement debt terms in which network communications are established between a user, such as a debtor, and a server is presented. The method comprises receiving information, at the server, regarding the loan agreement debt terms, presenting received information to a debtor, providing an interactive environment enabling a debtor to modify existing terms, submitting modified terms, processing data from the available information using a rules based engine, and processing a future payment request based on at least one decision made by the rules based engine. While online, the user/debtor may engage in revising a rejected future payment request in an attempt to reach a satisfactory renegotiation of debt terms.

18 Claims, 24 Drawing Sheets apollo Debtor Proposals
Enterprise Solutions
Online Debt Settlement

My Profile | Portfolios | Debtors | Reports | Tools | Context | Help | Logout

Debtor List (select)

Debtor Profile

Account:
Status:
Name:
Original Creditor:
Principal Balance:
Current Balance:

Available Settlements

Proposals

Make a Counter Offer

| Down Pmt. | Term | Interest | Expires | Monthly | Total |

Calculate    Submit to Debtor

METHOD FOR FUTURE PAYMENT TRANSACTIONS

This application is a continuation of co-pending U.S. patent application Ser. No. 11/372,850, entitled "Method for Future Payment Transactions," filed Mar. 9, 2006, which is a continuation-in-part of co-pending U.S. patent application Ser. No. 11/256,405, entitled "System for Resolving Transactions," Ser. No. 11/256,406, entitled "Method for Resolving Transactions", and Ser. No. 11/256,404, entitled "System and Method for Compiling Information for Resolving Transactions," all filed Oct. 19, 2005, which each claim the benefit of U.S. Provisional Patent Application 60/620,131, "Debt Settlement Computer System and Method," filed Oct. 19, 2004, all of which are incorporated herein by reference.

COPYRIGHT PROTECTION

A portion of the disclosure of this patent document contains material that is subject to copyright protection. The copyright owner has no objection to the facsimile reproduction by anyone of the patent document or the patent disclosure in its entirety and in the form as it appears in documents published or released by the U.S. Patent and Trademark Office from its patent file or records, but otherwise reserves all copyright rights whatsoever.

BACKGROUND OF THE INVENTION

1. Field of the Invention

The present invention relates in general to systems and methods for collecting debt and/or managing information relating to debt, and more specifically to systems and methods for processing and setting future payment transactions using a computer network.

2. Description of the Related Art

Financial transactions can entail establishing a series of payments over time to either purchase an item or settle or resolve a debt. One example of a debt resolution system is described in co-pending U.S. patent application Ser. No. 11/256,405, where a transaction resolution system is used to resolve debts between a creditor or debt buyer and a debtor/user. Such a system can facilitate debt resolution and can establish a payment schedule, such as payment of 36 payments of $500.00 per month.

Financial transactions such as a credit or loan contract or agreement, or a debt resolution, may provide for future payments to be made and applied against the outstanding debt or outstanding principal. The concept of "future pay" or "future payment" relates to an acceptable modification of debt terms within an existing contract for an additional payment or additional funds received.

A common example of future payment may be found in today's home mortgage lender contracts where the creditor may allow the debtor to include additional funds designated for application against their outstanding balance. Although common, current methods of collecting future payment are fairly limited and inflexible. Present future payment collection methods are limited to written solicitations and are typically communicated via monthly account statements delivered either by postal mail or as an electronic form via the Internet. Current methods are further limited because the debtor has only a few proactive options for providing future payment outside of the normal billing cycle. These proactive options typically include calling the creditor on the phone and requesting to make an additional payment, or by mailing a payment to the creditor with a letter of explanation. In short, the option must be presented and expected by the payee or creditor.

Current future payment collection methods may only provide the debtor the ability to make an additional principal payment to be applied to the principal amount remaining at the end of the loan. This becomes problematic when a debtor, who is current up to a point in their loan payment schedule, encounters unusual circumstances such as a receiving a windfall, encountering a natural disaster or illness or loss of employment, either affecting the debtor's ability to continue to satisfy the terms of their loan agreement or providing an ability to pay additional funds. When such a circumstance befalls the debtor, the situation can also affect the creditor's ability to collect funds.

In the situation where the user cannot meet the monthly payment, for example, the credit agency may wish to accommodate selected debtors, in this case those affected by a natural disaster, i.e. hurricane, during periods of time they may be unable to meet their obligations. The natural disaster or other circumstance may provide an incentive to the loan originator or holder to provide relief to debtors in a particular geographic area. In order to provide this relief, the debt terms generally will require modification or renegotiation. Modification or renegotiation can be problematic since the payment process is generally managed and realized via a programmed or paper-based process that requires effort and time on the parts of the creditor and debtor to create and execute new loan documents. In addition, multiple loan document copies may be required, signatures may need to be captured, and various instruments may require distribution and recordation to effectuate and implement the new changed circumstances. In addition, a manual paper-based modification process requires significant effort.

In a windfall scenario, the debtor may be unable modify debt terms in order to submit additional payments. For example, the debtor receiving a windfall may desire to pay a greater monthly installment or make additional principal payments by scheduling aperiodic installments during the life of the loan and may desire to pay different amounts in each aperiodic installment. Current payment schemes do not allow for the user to make additional payments on the outstanding debt. For example, if $5000 remains owed, with a $500 monthly installment due, a debtor paying $2000 has $500 applied against the outstanding payment and $1500 applied typically to the end of the loan. The following month requires an additional $500 payment. A debtor may wish to apply, in this example, the $1500 against the next three payments, or may wish to apply them to the next three December payments so she will not have to make payments around holiday time.

In current practice, for a debtor to engage in any of the above activities, debt terms will require complete renegotiation, and aperiodic payments are virtually unheard of. The renegotiation process is generally managed and realized via a paper-based process that requires effort on the parts of the creditor and debtor to create and execute new loan documents. Renegotiation of debt terms, whether desired on behalf of the creditor or debtor can be inefficient, cumbersome, and in certain circumstances difficult or unachievable.

Additional complexities arise when a party outside of the creditor and debtors mortgage loan contract, for example a relative or business partner, desires to provide an additional principal payment on behalf of the debtor. In this instance, the third party is typically unaware of the pertinent information and generally unable to make the payment without providing the funds directly to the debtor. This can be disadvantageous when the third party is a spendthrift, i.e. spends significant funds on matters other than the outstanding debt.

In light of the above, it would be desirable to have a system and method that improves collection of debtor initiated future pay, or future payment attributed to the debtor, and enables creditors to modify contracted debt terms "on-the-fly" in a manner readily accessible to users/debtors.

SUMMARY OF THE INVENTION

According to one aspect of the present design, there is provided a method for the online settling of a future payment transaction in which network communications are established between a user, such as a debtor, and a server. The server receives information regarding the transaction. Financial information, macroeconomic factors, historical data, and/or information from other sources pertinent to the transaction, such as a credit report, may also be obtained, and the information obtained and/or other information related to the user and/or transaction may be processed using a rules engine running on the server. The ability to accept future payment may be predefined or established on behalf of a party to the transaction, such as a creditor, based on a desired transaction resolution strategy. While online, the user or an authorized third party may edit debt terms describing the current debt in order to essentially present a modified or renegotiated debt contract, submit the modified debt terms and wait for a response (e.g. approval). The server may examine the submitted debtor modifications to the debt terms and applies these terms to the debt contract in accordance with transaction information previously received and may be processed using a rules based engine. The server responds by sending an acceptance of debt terms to the debtor or presents other offers containing modified debt terms to present acceptable approved contracts for the debtor to consider.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures:

FIG. 15 illustrates a general blank form including fields that may be filled with settlement offer data and presented to a creditor for purposes of issuing settlement offers;

FIG. 16 shows a portfolio manager and illustrates the concept of OrgUnits;

FIG. 21 illustrates a screen shot viewable by a debtor/user;

Figure 1:
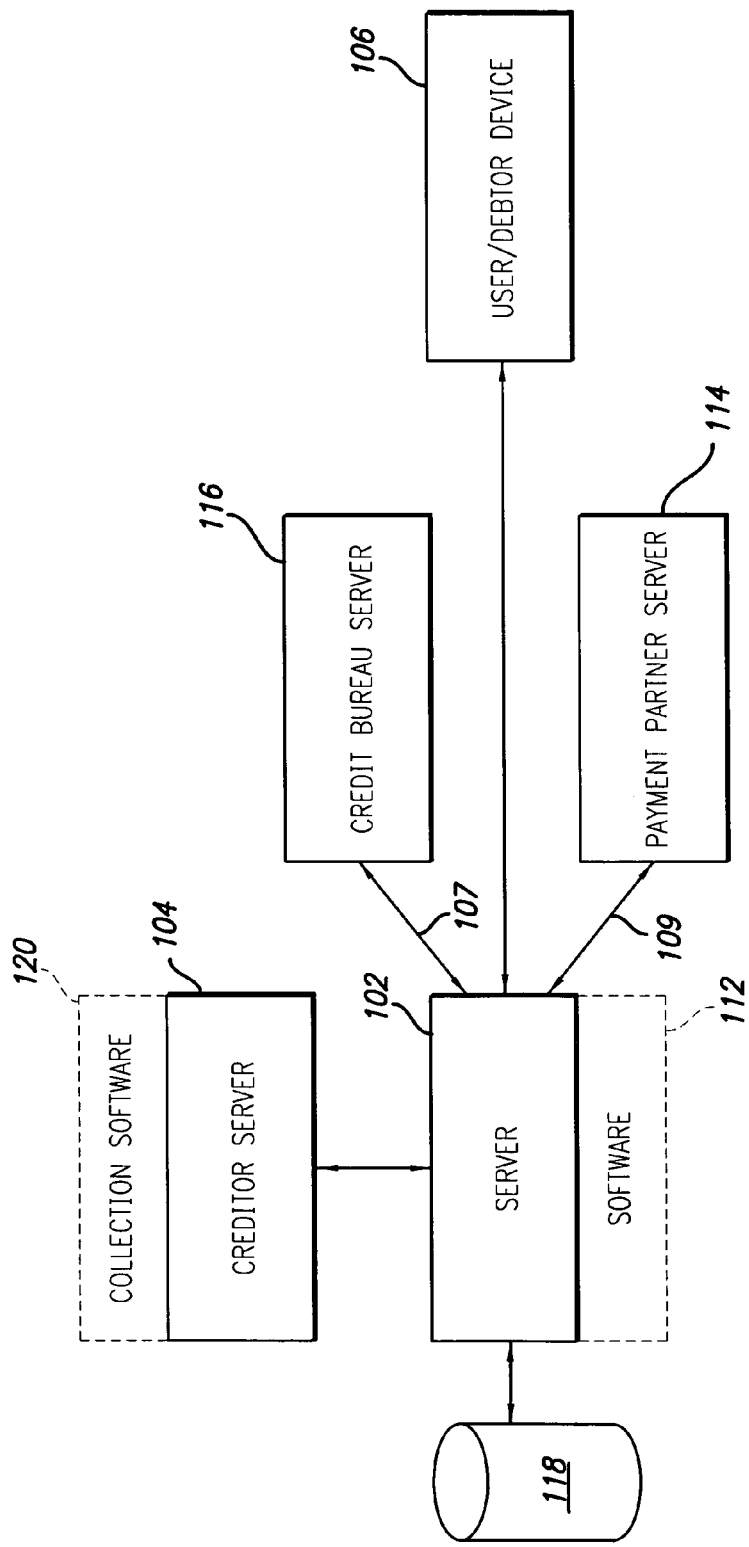
FIG. 1 illustrates a computer system for use in accordance with one embodiment of the present transaction resolution design.

The exemplification set out herein illustrates particular embodiments, and such exemplification is not intended to be construed as limiting in any manner.

DETAILED DESCRIPTION OF THE DISCLOSURE

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

In general, the present design includes a system and method for resolving transactions, including but not limited to resolving debts, resolving insurance settlement claims, establishing charitable donations, and the like, by providing an automated information collection system that collects information about one party, parses and/or operates on the information collected based on a set of rules established by the other party, and presents certain offers to an individual based on the information collected and parsed. The offers and information are typically provided via a computer network, such as over the Internet, typically via an encrypted connection. The individual may then elect one of the options presented or may refuse, whereupon certain additional information may be solicited and/or entered and the transaction moved further toward resolution. Even in instances where the transaction is not resolved using the present design, the information received can be useful in determining the ability and willingness of both parties to resolve the transaction and can indicate the next logical steps to resolving the transaction, such as initiating litigation or refraining from resolving the transaction altogether. The present design thus automates the overall transaction resolution process, and can reduce the costs, time, and complexities associated therewith at terms acceptable to the parties to the transaction.

Whereas previous systems have been offered that enable an online presentation of offers to suit a need, such as an individual contacting a website to obtain car insurance or a mortgage, those types of designs have typically presented a variety of offers to a user without any information regarding the user being sought regarding the user before presenting offers. While those types of sites may request input from the user, no external investigation or information seeking occurs before the three offers from three different lenders, for example, are presented to the user. The present design not only seeks relevant external information pertinent to the user and/or the transaction, but the present design also resolves an existing difference of opinion regarding the transaction. The present design contemplates two parties having different positions regarding an existing transaction, such as a debt, insurance settlement, or other two party type of transaction.

The present design brings the two parties together with the ability for one party to employ a set of rules in a rules based engine to form an offer set to resolve the transaction. The present design thus automates resolution of the transaction using information externally obtained regarding the transaction and/or user in a rules based engine having rules provided in part based on desired negotiation rules for one party.

The elements that implement the various embodiments of the present system and method are described below, in some cases at an architectural level and in others at a logical level. Many elements may be configured using well known structures. The functionality and processes herein are described in such a manner to enable one of ordinary skill in the art to implement the functionality and processes within the architecture.

The processing described below may be performed by a single platform or by a distributed processing computer platform. In addition, such processing and functionality can be implemented in the form of special purpose hardware or in the form of software or firmware being run by a general purpose or network processor. Data handled in such processing or created as a result of such processing can be stored in any type of memory as is conventional in the art. By way of example, such data may be stored in a temporary memory, such as in the RAM of a given computer system or subsystem. In addition, or in the alternative, such data may be stored in longer term storage devices, such as magnetic disks, rewritable optical disks, and so on. For purposes of the disclosure herein, a computer-readable media may comprise any form of data storage mechanism, including existing memory technologies as well as hardware or circuit representations of such structures and of such data.

The techniques of the present system and method might be implemented using a variety of technologies. For example, the methods described herein may be implemented in software running on a programmable microprocessor, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or other computer-readable medium.

Further, while primarily described herein with respect to an exemplary system and method for resolving transactions in a debt settlement scenario, the invention and disclosure herein are not intended to be so limited. As noted, the present design may be employed in a variety of scenarios, further including but not limited to insurance claim settlements, charitable contributions, and so forth.

As used herein, the term "entity" refers to an individual, corporation, partnership, or other type of legal entity. A specific embodiment of the system and method as described below is sometimes referred to as an "Intelligent Debt Settlement system" or an "IDS system", or even simply as an "IDS".

The system may be operated online, or via the Internet, as a web-based platform for creditors or their agents (including, for example, debt collection companies, collection agencies, and legal representatives) that allows debtors to settle accounts online at any time of day. Debtors may log into or connect to the system and settle accounts from the privacy of their home or office without the inconvenience of calling the collections department or a collection agency and talking to a collector. The system enables a creditor to create debt settlement terms online, using his own decision criteria, thus helping both the debtor and the creditor/collection agency more rapidly reach a mutually beneficial resolution online without involving the agency's collectors.

When the debtor engages in an online session, the system may acquire certain credit information, including but not limited to a credit report. Based on the credit information so located and collection criteria predefined by the creditor, the creditor/collection agency may determine the settlement offers available to the debtor based on the debtor's ability to pay. The debtor may choose a most desirable settlement offer in a less adversarial environment. The system may be employed to process payments using online bill paying techniques, and the system may update credit bureaus with current information, such as actual settlement of the debt. The system may send notification to all appropriate parties memorializing the transaction. The system may provide creditor information so that a creditor may view and manage real-time portfolio settlement parameters online.

The system generally may be implemented using open standards. The system may be, for example, built in Microsoft Visual Studio .NET and SQL Server 2000 and may be fully XML compliant. The system may run in a secure data center and may be enabled as a web service to provide the technology foundation for its strategic enterprise partners.

End users of the system may include delinquent consumer debtors with access to the Internet. For purposes of defining the entities potentially using and/or associated with the system, such parties may include "creditors," namely entities that loan money to other entities, such as individuals, and are owed money by these "debtors." Entities may include banks, credit unions, and other lending institutions, but also may include others who provide money, goods, and/or services to entities, such as attorneys, physicians, and so forth. A "primary creditor" is a creditor having an internal collection facility or capability. In this scenario, "debtors" are those entities who have incurred the debt from the creditors. Individuals, partnerships, corporations, government entities, and virtually any person or business structure may become a debtor. A "collection agency" collects on behalf of a primary creditor, typically for a percentage of the fees recovered. A "collection discounter" typically purchases debt and collects that debt internally, or in-house. A collection discounter is independent of the creditor or primary creditor, while a collection agency is typically an agent of the creditor or primary creditor.

A logical overview of the system is illustrated in FIG. 1. From FIG. 1, a computer system 100 includes a server 102 used generally for transaction resolution. Server 102 may be in communication over a communication network 110 with a debtor device 106 such as, for example, a personal computer or PDA. Creditor server 104, operated for or on behalf of a creditor (e.g., a creditor of a debtor operating debtor device 106) may be connected by a communication network 108 to server 102. Collection software 120, which may be existing software used by a creditor, runs on creditor server 104. Credit bureau server 116 communicates with server 102 over communications network 107. Payment partner server 114 communicates with server 102 over communications network 109.

Communication networks 107, 108, 109 and 110 may be, for example, the Internet or a local or wide area network. An application program, for example an Internet browser or another application to provide a graphical or other user interface to a debtor, may run on debtor device 106 and provide access by the debtor to server 102. A debtor account on server 102 may be activated or accessed, for example, using logon information provided by the debtor.

Server 102 may execute software 112, described in more detail below. Information regarding debtors, for example associated with debts held by the creditor operating creditor server 104, may be stored in account/transaction database 118 accessible by server 102. Note that other information may be obtained by the server either from internal or external sources to facilitate the transaction and to enable application of the rules described below with respect to software 112 to the data received in order to present the user with an offer set. Examples of information sought include information related in some manner to the user or the transaction, such as macroeconomic data, financial information, transaction information, personal information, or other pertinent data. For example, if a creditor in a debt transaction wishes to extend a time period for settling a debt when a user/debtor lives in a geographic area suffering from a natural disaster, the system may obtain the conditions of the area where the debtor lives. Such information seeking may be done based on the rules presented or separate from the rules presented. Such information may be obtained from, for example, the account/transaction database 118, from the creditor server 104, or from some additional remote source not illustrated in FIG. 2, such as a publicly accessible weather server or financial data server.

Software 112 may interact with collection software 120 so that debtor-related data is synchronized between server 102 and creditor server 104, such as in a real-time or secure batch process.

In general, the system illustrated in FIG. 1 operates to get the debtor and creditor or creditor representative/agent together to process the transaction, typically by offering a certain number of options to the debtor based on rules established by the creditor, wherein the information provided by the creditor may be parsed and processed to establish the options made available to the debtor. Server 102 may hold or have access to certain information but may functionally operate to hold information, collect information, and manage contact between the debtor operating debtor device 106 and creditor server 104, credit bureau server 116, and payment server 114.

Figure 2:
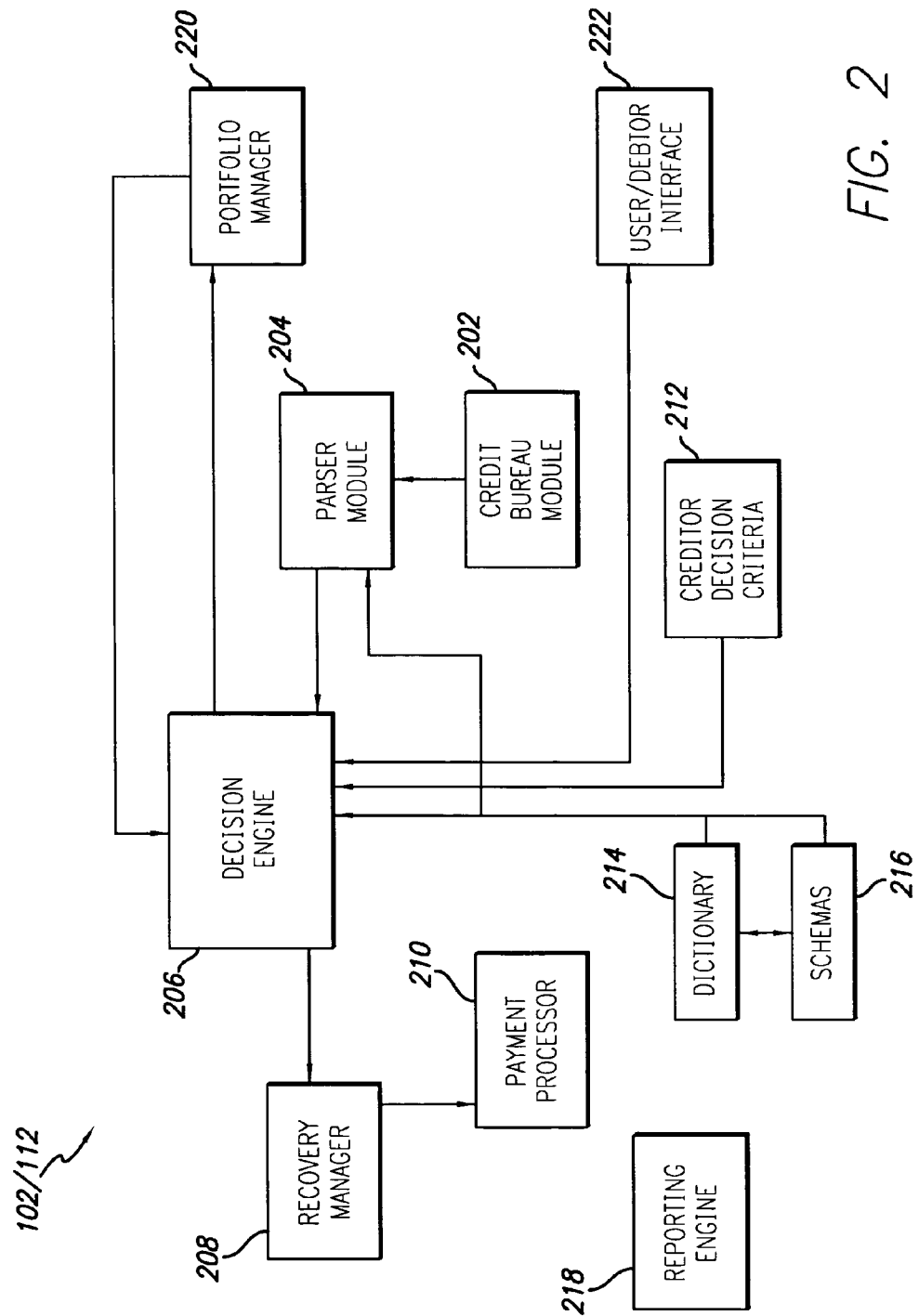
FIG. 2 is a logical representation of software modules executed by the server of FIG. 1 in accordance with one embodiment of the present design.

FIG. 2 illustrates the logical arrangement of software modules that may be executed by server 102 as part of software 112. Some or all of these logical modules could, for example, be distributed across multiple servers. Debtor interface 222 may provide an interface to debtors using debtor device 106 and provide information provided from such debtors to decision engine 206. Credit bureau module 202 may obtain credit reports from credit reporting bureaus for the debtor currently accessing server 102.

Credit reports typically come to either an entity investigating credit or an individual requesting a credit report in a form having significant amounts of information, including but not limited to account entities such as credit card issuers, auto and home loan creditors, and may include information such as payments made or missed, judgments, bankruptcies, and other pertinent information. In certain instances, a credit rating or credit score is computed and provided. Typically the report includes the person or entity's name, and other identifying characteristics, such as an address, telephone number, birth date, birth place, social security number, or other personal information. For persons or entities having significant activity, such a credit report can include hundreds or even thousands of individual pieces of information.

Credit reports are generally distributed in a format particular to their issuer. For example, Credit Report Bureau A may provide a script or other data format, such as a series of records, that includes (in order) Last Name, First Name, Middle Name, Current Street Address, Current City, Current State, Current Zip Code, Current Telephone Number, Bankruptcies, Date of Bankruptcy, Court of Bankruptcy, Account Name, etc. Credit Report Bureau B may provide a different script or other data format that includes First Name, Middle Name, Last Name, Current Area Code, Current Telephone Number, Current Street Number, Current Street, Current Unit Number, Current State, Current Zip Code, Credit Score, Account Name, Account Status, Payment By Month on Account, and so forth. While the same general information may be included, the format and ordering may be completely different, and different entries may be present. The result is a different credit report for each issuer.

The system 100 obtains the credit report in the form provided by the credit bureau server 107 at the credit bureau module 202. Typically credit bureau identification information is provided with the credit report, such as the credit report is provided by Credit Report Bureau A. Alternately, the credit bureau module 202 may be instructed to obtain a credit report from Credit Bureau A on individual X and may contact the credit bureau server 116 to obtain the credit report. At that point, credit bureau module 202 would know the credit bureau server being contacted, i.e. that of company A, and would be able to forward that information to parser module 204 if not present in the credit report.

Simply put, credit bureau module 202 receives a request, typically from the decision engine 206, to obtain a credit report from credit bureau A. Credit bureau module 202 then obtains the credit report from the credit bureau server 116 for credit bureau A, and may perform some level of functionality on the report received, such as converting the report into a format usable by parser module 204 or locating certain limited information. In general, credit bureaus generate information and reports in a consistent manner and format, and thus a report from a bureau will adhere to a predefined format. If this format changes, such as by adding new fields or data, that information may be accommodated by changing the expected parameters within credit bureau module 202 or parser module 204.

The credit bureau module 202 combined with parser module 204 may perform certain functionality, while certain functions are performed by the credit bureau module 202 and others by the parser module 204. In general, however, the parser module takes the information received in the form of a credit report and parses the information into useful information to the system, and discards any unnecessary information.

The information extracted depends on the situation, but may be appreciated and understood beforehand, such as retaining the individual's first and last names but discarding current street address. The result of information parsing may be a set of information in a desired format that can be operated upon by other modules in the system.

The system may parse information based on the rules generated for the particular creditor or credit agency. For example, if a certain creditor only wishes to offer a transaction based on an individual's credit score, bankruptcy history, and current bank balance in all accounts, only that information may be extracted by the credit bureau module 202 and the parser module 204. Thus the system parses information based on the report provided in combination with the rules established by either the creditor/credit agency or optionally by the party maintaining the software 102. Rules for individual creditors may form part of the schemas 216 and/or dictionary 214 and thus may be available to the parser module, either via the decision engine 206 or independent of the decision engine (not shown).

As an example, credit bureau A may provide a credit report electronically in a particular format. The credit bureau module 202 may receive the credit report knowing it is from credit bureau A. The credit report may have been generated as a result of an inquiry by creditor or credit agency P. Thus the credit bureau module 202 and parser module 204 may know that a credit report from credit bureau A is being parsed for the benefit of creditor or credit agency P. With this information, the parser may acquire from the credit report only that information needed based on the rules for creditor or credit agency P. Based on the rules generated for creditor or credit agency P, the only inputs required to perform the rules may be number and dates of bankruptcies, delinquent payments more than 60 days on at least two accounts, amount of money available in all known bank accounts, and credit score. Based on the inputs required for the rules, the parser may then extract the required information from the credit bureau A report.

Alternately, a uniform set of rules may be developed wherein the information retrieved may be a general or universal set of information independent of creditor or credit agency. For example, the parser may universally retrieve credit score, funds available in all bank accounts, identification information, total number of delinquent payments, number and dates of bankruptcies, and total credit available for an individual. While this information may be located in different places in credit reports from credit bureaus A, B, C, and so forth, this type of information is typically available in a standard credit report and may be extracted from a bureau's credit report.

Note that while certain examples are provided here and throughout this document, these examples are meant to be illustrative and not limiting as to the functionality of the present system and method. Other examples and implementations are possible and this document should not be limited by the examples presented.

The result from parser module 204 is a set of information parsed from a particular credit report for a particular entity that may include only that information pertinent to a particular creditor or credit agency.

In other words, parser module 204 may parse information from a credit report for processing and decision-making by decision engine 206. More specifically, parser module 204 may extract and calculate user or creditor/credit agency defined credit report items and current account data, and then submit both the calculated bureau and account data to decision engine 206 for decision making processing.

Decision engine 206 may compute, calculate and generate multiple settlement offers for the debtor based on information received from the individual's credit report, including, for example, the debtor's ability to pay and the debtor's bank and credit card account history. This history may be determined, for example, by accessing account/transaction database 118 using decision engine 206. Account/transaction database 118 may contain information about particular debtors either acquired by means independent of those modules shown in FIG. 1, or from the modules provided such as credit bureau server 116, payment partner server 114, or from the debtor via debtor device 106. Information may include, but is not necessarily limited to, previous information obtained about a particular debtor either from a credit bureau or otherwise, such as payment history, credit score, bankruptcies, delinquent payments, and so forth, as well as identifying information. In the event certain information is unavailable at a later date, any information about debtor stored on the debtor account database may be used where appropriate. Further, if a debtor logs onto the system and selects or refuses to select certain options presented, that information can be maintained for, at the very least, access times and accessing URLs by the debtor where appropriate. Debtor interface 222 may also assist in providing this history data to decision engine 206 by accessing account/transaction database 118.

Debtor interface 222 serves two functions: providing an interface to the debtor directly, such as during an online session, and possibly accessing the debtor account database where appropriate. A typical session will be prompted by notifying the debtor in some fashion, such as by prerecorded telephone message, letter, or possibly electronic contact such as email or text messaging. The debtor may then access an established web site typically controlled and/or operated by the owner/operator of server 102. The user may log into the site using standard, typically secure Internet protocols, such as by the user/debtor logging into the web site, essentially connecting the debtor with the system 100 via the debtor interface 222. The debtor may be presented with a series of identification questions, establishing the user's identity including but not limited to providing a social security number, answering questions that collectively only the correct user/debtor might know, such as "When is your birthday," "At which branch did you open your Bank of America account," and "What is the last name of the attorney that represented you in your 1994 bankruptcy?" The user may need to answer a series of questions to establish identity. Additionally, the user/debtor may be provided a code when he or she is initially contacted, such as when the debtor receives a letter, email, text message, or telephone message, and the user/debtor may be asked to provide that code in addition to answering other pertinent identification questions. Once debtor interface 222 identifies the user to a satisfactory degree, where satisfactory is determined by the situation and the desire of the credit agency or entity controlling or maintaining the server 102. More security may be needed in extreme cases. Other methods of authentication may be used, including but not limited to voice recognition hardware and software, fingerprint recognition, and so forth, to decrease likelihood of an errant identification.

Once a user has been verified or authenticated, the fact that the debtor has logged onto the system is noted and may be stored, such as in the account/transaction database 118. The user/debtor may identify the debt for which he or she is inquiring, typically by selecting from a menu which may contain one or more debts available to be settled. At that point, one of two things may happen. If a credit report is available and has been parsed by parser module 204, the decision engine may recognize the debt as being associated with a creditor and may obtain the applicable creditor rules and decision criteria and compute a set of offers to present to the user/debtor, such as by presenting a set of options on screen to the debtor. If the credit report has not been received and parsed, the user may be told to wait for a reasonable amount of time, such as a few minutes. Otherwise, if the credit report may not be obtained and parsed within a reasonable amount of time, the user may be told to return at a specified time or thereafter. For example, a message may be transmitted to the debtor/user that at least one settlement offer is being prepared and the debtor/user should log back on after 4:00 p.m. EST. The user may be provided with a session code or password(s) so that she does not need to go through the identification process questioning again.

If the decision engine 206 has available parsed credit report information, either upon authentication of the user/debtor or after the user/debtor has reconnected via debtor interface to the system, the decision engine 206 may obtain schemas, rules, and a dictionary appropriate for the creditor/credit agency or other entity seeking resolution of the debt transaction. The decision engine 206 relies on dictionary 214 and schemas 216 in presenting the set of options or decisions to the user/debtor. In this context, a schema is a structured framework of rules appropriate to the situation. As an example, a schema may be associated with creditor/credit agency X, and may include rules such as:

"Only offer a maximum of three options to any debtor at any one time"

"If the user/debtor has incurred more than one bankruptcy in the last ten years, the only offer made available will be payment of between 100% and 90% of the debt"

"Offers made will only be available at the time of initial logon, and if the debtor/user logs out or loses connection for any reason, the only offer made available upon subsequent logon will be payment of between 100% and 90% of the debt"

"If the debtor/user has a credit score over 650, the debtor/user will be offered three options initially, including (1) an offer to settle immediately for 100% of the outstanding debt, (2) an offer to finance 100% of the debt over 12 monthly installments at 8% interest per annum, and (3) an offer to finance 100% of the debt over 24 monthly installments at 10% interest per annum. The debtor/user will be presented with a statement that agreeing to settle the debt under option (1) will not materially affect his/her credit score, but options (2) and (3) will cause a report of a late payment to be reported to all appropriate credit bureaus. If the debtor does not accept any of options (1), (2), and (3), then offer the user/debtor a second set of options including one option, settlement of 90 percent of the debt with a statement that such payment may be made immediately but will be reported as 'deficient' to all appropriate credit bureaus"

"If the debtor/user has a credit score over 675, and has a ratio of this debt to money available in all accounts of less than 5 percent, and the ratio of all other outstanding debt to money available in all accounts is less than 25 percent, then make four offers to the debtor user: (1) an offer to settle for 90 percent of the outstanding debt, with no report made to credit bureaus; (2) an offer to settle for 85 percent of the debt for 12 payments at 10 percent annually, with a delinquency report to credit bureaus; (3) an offer to settle for 80 percent of the debt for 24 payments at 12.5 percent annually, with a delinquency report to credit bureaus; and (4) an offer to settle for 50 percent of the debt paid immediately, and the remaining 50 percent financed over 12 months at 5 percent per annum, with no report made to credit bureaus."

As may be appreciated from the foregoing, the rules and schemas may be generated to include virtually any set of rules and conditions and may be very complex. The set of rules and schemas in schema module 216 may be provided by the creditor/credit agency, or the entity controlling the server 102, or a combination of both. For example, creditor B may desire a set of schemas to apply under certain conditions, including applying financing terms at specific percentage rates per annum. The entity maintaining the server may automatically increase the percentages by 0.25 percent to be allocated to the entity maintaining the server. Alternately, the entity maintaining the server may dictate that due to certain regulations in specific jurisdictions, under no circumstances may a debtor in a particular jurisdiction be offered a settlement that includes a financing percentage rate of over 25 percent. Certain creditors may only offer general guidelines for settlement offers, and the entity maintaining the server 102 may implement the guidelines and establish the rules and schemas.

For example, a creditor may simply indicate a desire to make exactly three offers to every debtor/user, including one offer for 100 percent of the outstanding debt and two financing offers with percentage rates and terms based on the debtor/user's credit score, with lower rates for higher credit scores. The entity maintaining server 102 can take this information and create rules and schemas implementing the desires of the creditor and can implement a rate scheme based on debtor/user credit score, with specific restrictions for jurisdictions having maximum interest rate requirements. For example, if the debtor/user has a credit score of under 500, the financing rate for both offers may be 25 percent, with different terms; if over 500 but less than 650, then 10 percent for 12 months and 12 percent for 24 months are offered; if over 650 but less than 750, then 6 percent for 12 months and 8 percent for 24 months; and if over 750, then 5 percent over either 12 or 24 months.

Reporting to credit bureaus may be offered if desired, and rates and conditions may change periodically, thereby requiring a change to schemas or the data used to apply the rules. For example, if a schema contains a rule using the prime lending rate to determine financing terms, the prime rate may be implemented in the system, such as in the dictionary 214, and changed periodically, or the decision engine may obtain the prime rate constantly through some type of interface to a device that provides the prime rate updated periodically.

Decision engine 206 is therefore typically a rules-based engine that uses rules previously defined, for example, by the administrator of server 102 or another entity having a business or other relationship to server 102. The rules used by engine 206 may therefore also include information defined by creditors in creditor decision criteria 212, and the decision engine 206 may be interactive, meaning that persons external to the decision engine 206 may provide information that may be used to present offers via the debtor interface 222.

Thus the overall functionality of decision engine is to interact with the debtor via debtor interface 222, and once the debtor is authenticated, obtain the parsed credit information for the user and any information about the debtor from the account/transaction database 118. Based on the specific debt owed, the decision engine uses dictionary 214, schemas 216, and creditor decision criteria 212 to prepare a set of offers to the debtor, the set including at least one offer. The offers are then conveyed to the user via the debtor interface 222 and the debtor may select one for resolution of the transaction.

The rules used to generate the set of offers by decision engine 206 therefore may include, for example, a large number of various mathematical, logical, or other functions that use data associated with the debtor as operands. Data could include debtor information provided by a creditor such as, for example, size of the debt, the date the debt was created, and the last payment date. Other information used by these functions and other rules may include data obtained from a credit report obtained for a debtor such as, for example, the debtor's current credit score.

Dictionary 214 generally represents a translator of terms employed within the credit report, schemas, and creditor decision criteria. For example, one credit report may use the term "Last Name" while another credit report may call the field "Surname," essentially meaning the same thing. The dictionary provides for translation of terms received from credit reports or within creditor schemas to a term that can be recognized by decision engine 206. Another example would be a credit report containing the field "last delinquent payment," used by decision engine as "date of last delinquency" and contained in other credit reports as "last missed payment," "most recent unfulfilled obligation," etc. In addition to converting from one set of terminology to another, conversions and other translation parameters may be included in dictionary 214, such as when an interest rate is provided as a monthly rate, conversion may be provided to an annual rate. Translations and dictionary entries may be provided for translations between credit reports, rules within schemas, and internal variables employed by the decision engine 206. In general, the decision engine may obtain rules and schemas from creditor decision criteria 212 and/or schemas 216 and credit reports from parser module 204 and credit bureau module 202 and may translate them into a format usable by decision engine 206.

Schemas 216 may be used to import source data, for example, provided from creditor server 104, to server 102. Schemas may be, for example, edited using a schema editor, known to those skilled in the art, that may run on server 102 and be accessible by a creditor using the system 100. Such an editor may alternately run separately from the system and may enable providing an edited schema to the system 100. Source data, namely the source of data for the schemas, such as rules, criteria, and other information typically originates with a computer system or server maintained by a creditor, such as creditor server 104. Source data usually has very different data structures depending on the creditor system provides the data, and thus data received by the server may be converted before being stored as a schema.

Dictionaries may be produced or augmented using client specific schemas, where dictionaries are used to translate information from one form or version to another. Schemas may be analyzed and depending on the terms, terminology, formats, and aspects employed in the schema, certain translations or conversions may be offered in the dictionary. Such analysis is typically performed offline by a human but can in certain limited circumstances be automated. Source data may be processed through a schema 216 to create one or more different rules dictionaries (e.g., one or more of dictionaries 214). ETL (extend, transfer, and load) processing may be done on these source data files as part of this importing. One or more source data files may be selected for processing by a particular schema. The choice of the source data file(s) and the schema can result in the production of different dictionaries 214 where each dictionary may have different rules and field types.

Dictionaries 214 may include definitions (as mentioned above) that include, for example, both offer variables and guidelines, where guidelines may be offered as part of a dictionary 214, schema 216, or creditor decision criteria 212 or other appropriate location in the server 102. Guidelines may be defined requirements that a debtor's profile must meet in order for a certain offer or set of offers to be made. Offer variables may be functions used to generate offers based on, for example, predefined mathematical functions. For example, a certain offer may require that a debtor live in a particular state and the offer may be generated based on a mathematical formula that uses, for example, the size of the debt and the number of days since the last payment. The offer variables may include adjustments to basic default values where such adjustments are governed by a rule. For example, where an offer variable sets a value (e.g., "Expiration (days)=25"), a rule such as, for example, "If Accrued Interest >=1000 then Value(Expiration (days))=37", can be used to create an adjustment of the initial value of 25 if the defined condition is satisfied by the data corresponding to the debtor. These rules may be housed in the dictionary 214, but are more typically included as part of creditor decision criteria 212 or schemas 216 and may be located in other positions within the server 102.

Figure 8:
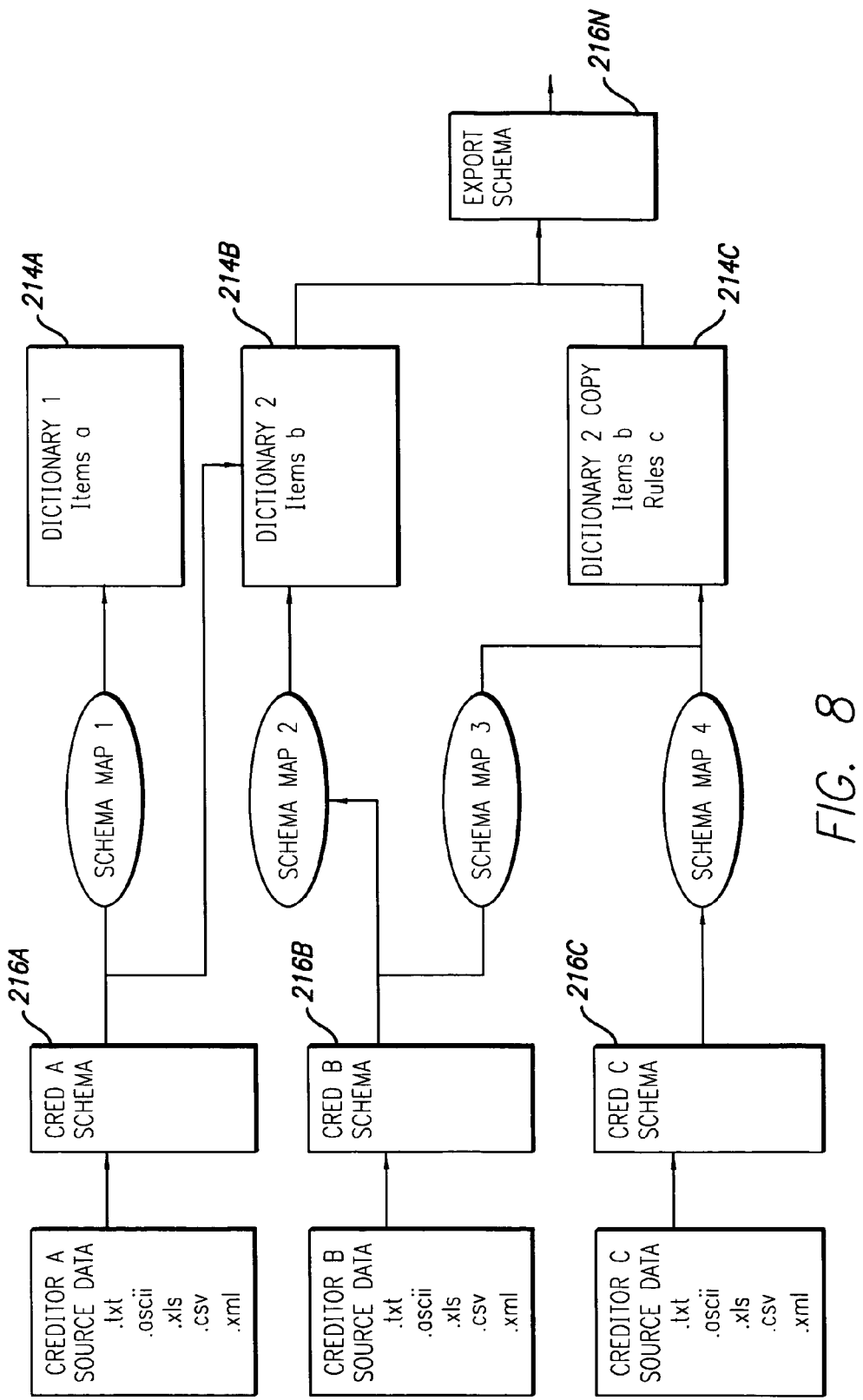
FIG. 8 is one embodiment of the general concept of mapping source data to dictionaries using schemas.

FIG. 8 illustrates one embodiment of the general concept of mapping source data to dictionaries 214 using schemas 216. Each schema 216 is defined to match up to data produced by a different source, such as a financial institution or other creditor or credit agency. A schema imports and transforms source data into one or more selected dictionaries 214. Mapping may occur using a schema map. Fields of source data are typically different from the final fields desired in the dictionaries 214. For example, source data may include fields such as "prime lending rate" having four digits while the server 102 operates using a field called "prime rate" having five digits. The schema may map prime lending rate into prime rate and add a 0 to the value provided.

Source data may be mapped to more than one dictionary, and two or more source data files may be mapped to a common dictionary. Using formulas in the schema map, certain pieces of source data may become calculated or derived values that may be placed into many different fields in the one or more dictionaries 214.

The server may alternately create a second dictionary as a standalone dictionary or a copy of a first dictionary, where the second dictionary may be edited to have rules different from the first dictionary. In addition, the mapping process discussed above can be used to export data from a dictionary, for example, by creating a schema that transforms dictionary data into an export data file.

Settlement offers will vary by debtor. The settlement offers may, for example, present differently structured financial terms to the debtor. Offers may include a discounted lump sum immediate payment and a monthly payment amount financed at a stated interest rate.

Creditor decision criteria 212 represents information (e.g., stored in memory accessible by server 102) that may be used by decision engine 206 in generating settlement offers. Criteria 212 may be information previously provided by one or more creditors each independently accessing server 102 using its own creditor server 104. Criteria 212 may be stored as a set of rules that decision engine 206 follows in generating offers.

The various rules used by decision engine 206 also may be optimized by performing analytics on the rules and the corresponding collection results achieved. Rules may be optimized for a particular creditor, for a given set of debtors, or for other specific situations.

As an example, optimization may take into account recovery rates if desired by the creditor/credit agency or entity controlling or operating server 102. If a recovery rate for a group of debts is approaching 100 percent, the offers made to remaining debtors may change in some manner, such as reducing the financing rates or offering 90 percent settlement offers rather than 100 percent settlement offers. Conversely, if the recovery rate approaches 0 percent or is down from that desired, higher finance rates or an inability to finance may be offered, or offering only 100 percent settlement offers rather than 90 percent settlement offers. Other optimizations of rules may be provided.

Recovery manager 208 is an optional aspect of the design wherein a creditor may have specified that debtor offers be reviewed and/or approved by a collector or supervisor, for example, designated by the creditor. As part of the foregoing transaction resolution process, a creditor may log onto server 102 in order to see, for example, a queue of alternative offers being presented by debtors. The creditor may approve, disapprove, or otherwise initiate an action for a particular debtor.

It should be noted that while the logical representation presented in FIG. 2 of the software illustrates various blocks, modules, and components, the lines of demarcation between the various components are not hard and fast, and certain functionality may be performed by various components, including single components or combinations of components, and the functionality described herein is not a hard and fast set of requirements. For example, decision engine 206 may simply apply the rules and schemas to the parsed credit report from parser module 204, and recovery manager 208 may develop and present the offers to the user/debtor via debtor interface 222.

Payment processor 210, also an optional component, may execute some or all of the payment processing and accounting functions of the collection and recovery process. The user/debtor, as noted previously, may select a settlement offer that includes payment terms financed over a period of time, or other type of structured settlement. Payment processor 210 may enable the user/debtor to utilize multiple forms of payment, which may increase the debtor's ability to pay his debt. For example, payment processor 210 may enable a specified sum to be charged to a credit card, ATM card, or bank account periodically. Payment processor 210 may also manage the distribution of payments and/or credits to any party (e.g., any party related to the original debt transaction of the debtor and/or the settlement transaction handled by server 102). Payment distribution may be based on portfolio distribution rules stored, for example, on server 102 and accessible by payment processor 210. For example, if a credit card issuer receives 4 percent of a transaction and the remaining 96 percent is split as 2 percent to the entity operating the server 102 and 98 percent to the creditor/credit agency for any debts in a group paid by credit card, the payment processor allocates 4 percent, 1.92 percent, and 94.08 percent to the credit card issuer, entity operating the server 102, and creditor/credit agency, respectively. Thus the functionality of payment processor 210 is to divide the payments received in any form and distribute the payments received according to a set of predetermined rules. In order to perform this functionality, payment processor 210 may interact with payment partner server 114, where payment partner server represents, for example, a server operating at a bank, credit card issuer, or other entity, and may be used to process the transaction selected by the debtor/user and divide the payment made immediately and thereafter among the appropriate parties according to a set of established rules. The rules may be located in schemas 216, or other appropriate part of the system, including but not limited to recovery manager 208 or payment processor 210.

The present system affords the ability, within server 102 and in association and via software 112, to establish divisions within payment partners, creditors, credit agencies, and so forth, in the form of units called OrgUnits, or units within an organization. An organization, such as a credit agency, may be broken into various divisions or units, such as collections, financing, accounting, and so forth, and even broken down within those divisions or units into sub-units. The present system establishes those OrgUnits and enables rules to be applied by an individual OrgUnit or collectively for all OrgUnits. Payments may be made to or allocated to individual OrgUnits in an organization.

Portfolio distribution rules typically are general ledger (G/L) Account distribution rules. Each OrgUnit may have 2 or more charts of accounts (typically a cash-basis Trust Chart and an accrual-basis Operational Chart). When an online payment is received by an OrgUnit via the payment processor 210, distribution rules defined for each Chart of Accounts generally specify how the payment is to be applied to Fees, Principal and Interest balances, and in which order. Additionally, the same distribution rule may specify a "split" transaction, for example debiting Accounts Receivable and crediting Revenue in the accrual Operational Chart. Account Distributions define all in-flows and out-flows of money to the system 100. Furthermore, within the portfolio manager 220, accounting rules may be bound to Portfolio Lifecycle Events, such as Paid-in-Full, or Promise-to-Pay, thus binding specific pools of debt to specific contractual arrangements governing that debt within the system 100. Portfolio manager 220 may therefore receive information related to a resolved transaction and, once the payment has been processed by payment processor 210, account for those distributions to each OrgUnit for each dollar received and paid. Certain accounting rules may be employed to appropriately allocate the distributions between OrgUnits.

Reporting engine 218 collects information regarding the debt, the actions of the debtor, the offers made, the offer accepted, the payment made and any payments to be made in the future, and other relevant information computed within the system and provided by the system and can compile the information as desired in a report format, such as in a spreadsheet or other document form. For example, a creditor/credit agency can receive a report, either on demand or periodically, of the amount of a debt pool settled, the terms of settlement including payments received, the form in which they were received, and future payments to be received on particular dates. The result is a generally configurable set of reports that may be generated by the reporting engine 218 for the benefit of creditors, credit agencies, the entity or entities controlling the server 102, and any other appropriate entity having an interest in the transactions resolved by the system 100.

The reporting engine 218 may therefore generate and optionally send periodic reports (e.g., daily, weekly or monthly) to some or all authorized parties. Reporting engine 218 may communicate with, for example, payment processor 210 to obtain debt status information and recovery manager 208 to access, for example, creditor predefined rules governing the reporting of information.

Portfolio manager 220 may provide debt balance management and the migration and/or sales of debt portfolios to other entities. Debt balance management in this situation is again guided by rules, such as payment of taxes to governmental entities by specific OrgUnits, payments by OrgUnits to other entities or OrgUnits of prearranged quantities, such as rents, fees, dues, or other inter-entity transactions, and other relevant payments as dictated by rules maintained on the system 100.

The functions of portfolio manager 220 therefore may be based on rules including information from creditor decision criteria 212. As a further example, portfolio manager 220 may group debts by sub-portfolios for sale based on a predetermined set of criteria (e.g., established by a creditor). In this manner, portfolios may be sold or transferred between entities or OrgUnits if they fit predetermined criteria. Such an arrangement may include credit agency A providing a rule that it would be willing to take on a debt portfolio from a creditor (not another credit agency) if the amount due in the entire portfolio is between $1 million and $5 million and the average credit score for all borrowers is over 625 and no debt is over 120 days delinquent. Credit agency A may specify a rule that it would purchase such a debt portfolio by paying the creditor 20 cents per dollar of debt owed. Thus rules are used to manage the portfolio using portfolio manager 220.

Figure 3A:
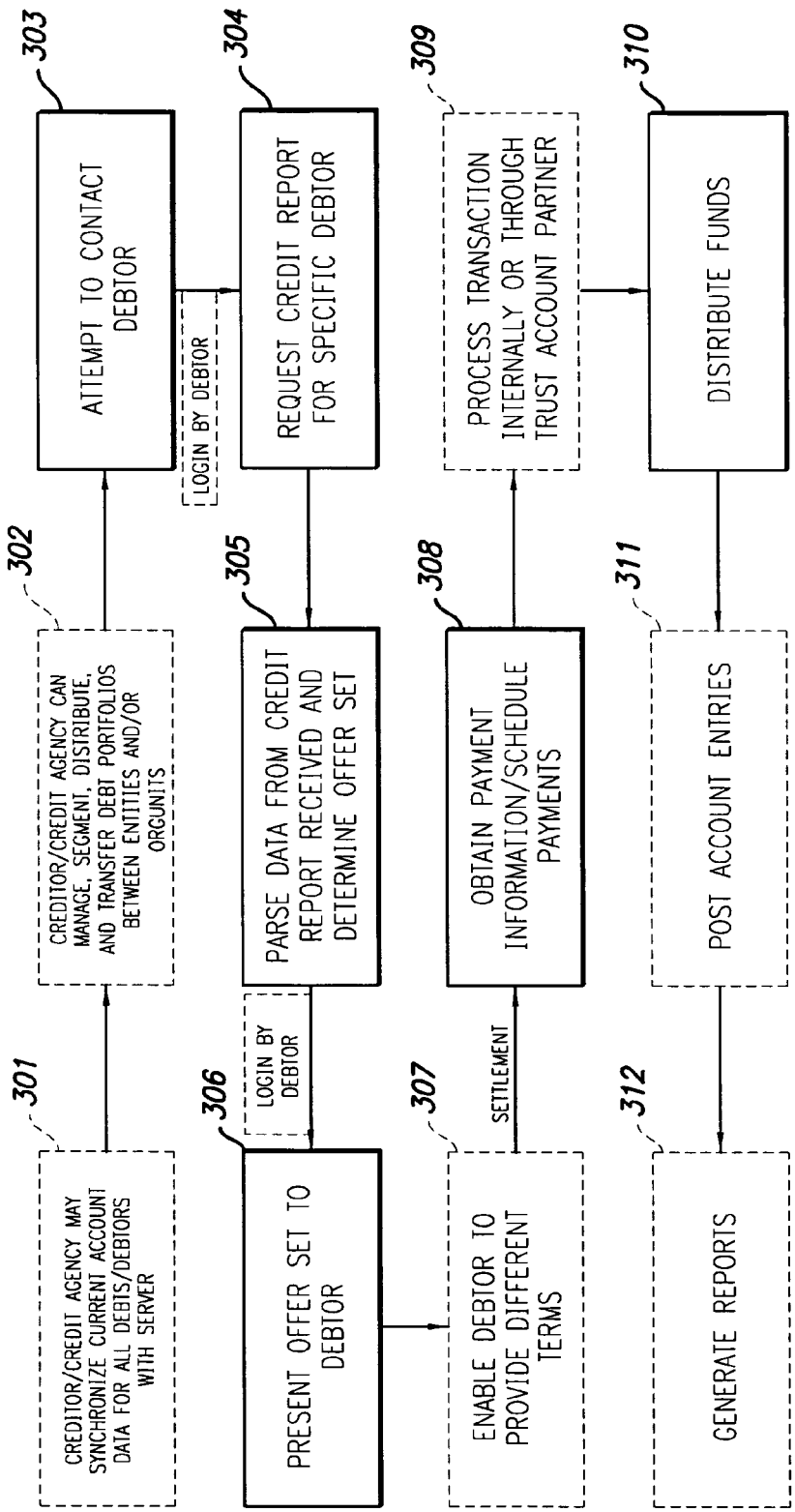
FIG. 3A illustrates a process flow for debt collection in accordance with one embodiment of the present design.
Figure 3B:
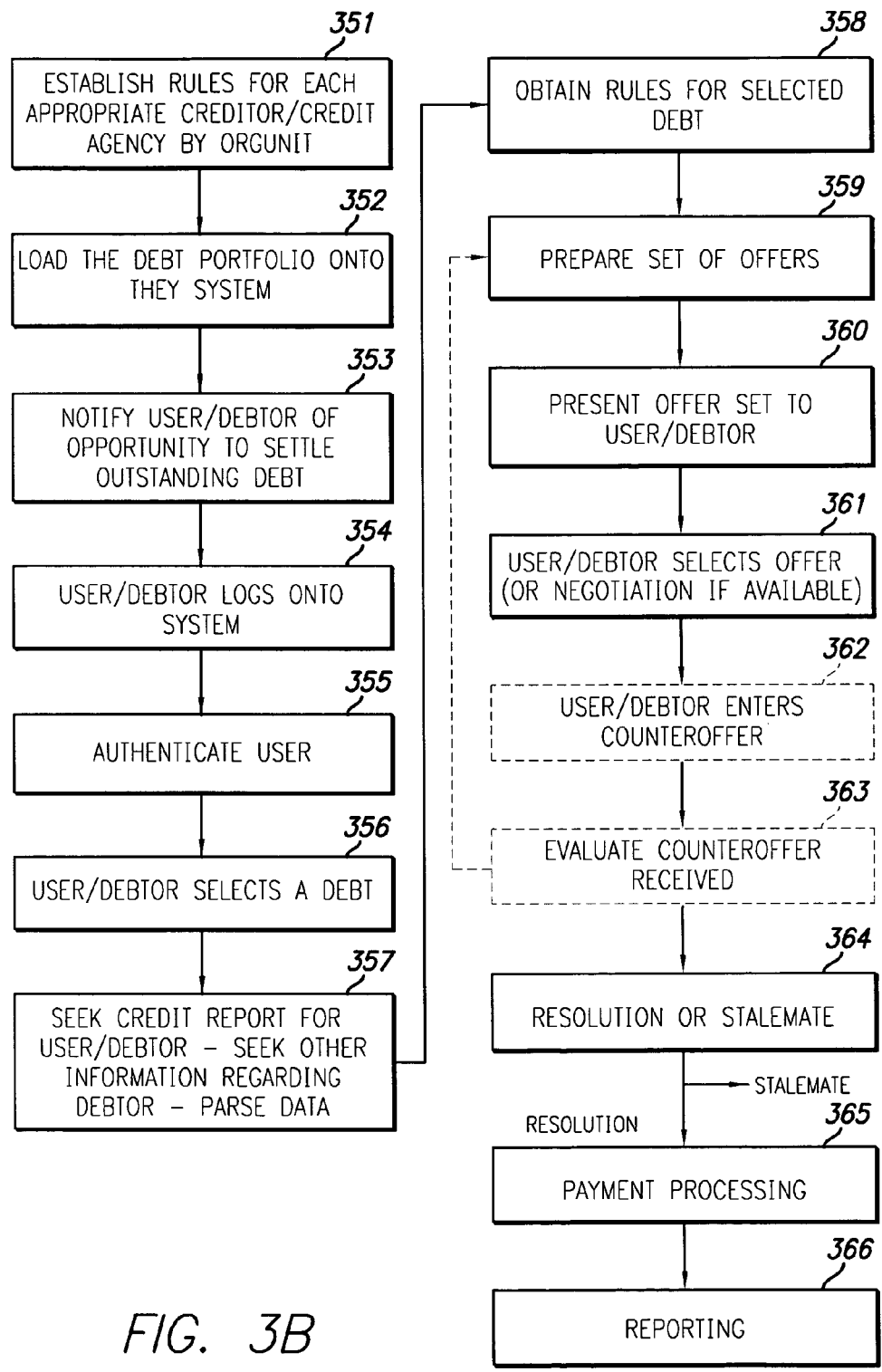
FIG. 3B is an alternate process flow for the present design.

A general process flow is illustrated in FIG. 3A, while an alternate process flow is presented in FIG. 3B. From FIG. 3A, point 301 indicates that the creditor or credit agency may synchronize current account data for all debts and debtor information with the server 102. Point 302 indicates that the creditor or credit agency can manage, segment, distribute, and transfer debt portfolios based on established rules and approval for such transactions, either between entities or between OrgUnits.

The debtor may be offered an incentive from the creditor to settle the debt. The debtor may be offered such incentives using, for example, print mail, telephone, or electronic mail. As noted, the debtor is known to the creditor or its assignee or agency, and the creditor/assignee/agency typically has some form of contact information for the debtor. While persons may have relocated or provided incorrect contact information, point 303 indicates an attempt by the creditor/assignee/agency to contact the debtor in the manner suggested. Typically the debtor may be provided with a web site and a code, and a certain number of debtors may respond to such a solicitation. Alternately, the debtor may contact the creditor/assignee/agency and indicate an interest to resolve the debt, at which time the debtor may be provided with information for contacting or logging onto the server 102. Thus various means of establishing contact with the debtor may be employed, with the end result being the debtor being provided with contact information for contacting server 102.

Once a debtor logs onto, for example, a website hosted by server 102 and authenticates himself or herself, the software 112 may request a credit report for the debtor identified using credit bureau module 202 at point 304. As credit reports can typically only be obtained with specific permission from an authorized entity, the credit report request may be deemed by the credit bureau as a request associated with the creditor of the debtor (or with the creditor's collection agency) when requested by the credit bureau module 202 from credit bureau server 116. The credit report may be obtained in this manner, and data from the credit report may be parsed by parser module 204 and used by decision engine 206 as described above at point 305.

At point 306, settlement offers may be presented to the debtor on, for example, a webpage. Offers are calculated by the decision engine 206 as discussed above, according to the parsed information from the credit report and the rules established by the creditor or credit agency. An example of a set of offers to a debtor is presented in FIG. 6. Each offer may have an expiration date associated therewith and an icon or button for the debtor to select to enable acceptance of a particular offer.

At point 307, the webpage generated by server 102 may also present, for example, an icon or button for the debtor to click to indicate a desire to negotiate other terms with the creditor using server 102. Terms of such a negotiation may be specified by the creditor or credit agency and/or entity controlling the server. For example, a creditor may not wish to offer an ability to negotiate. Credit agency A may offer the user/debtor one attempt to negotiate, while credit agency B offers three opportunities to negotiate.

Negotiation enables the user to set terms according to his or her desires, and thus makes available to the debtor various appropriate fields, such as in an HTML web page having data entry fields, for data such as amount user/debtor is willing to pay now, amount per month user/debtor is willing to pay per month over the next 12 months, 24 months, etc., interest rate desired, term desired for repayment, and so forth. Terms offered should be consistent. As an example, the user may be willing to pay a certain amount over a number of months and may wish to make an arrangement that accomplishes this goal. If the two offers initially made are to pay $500 per month over 12 months and $275 per month over 24 months, the debtor may consider these offers difficult or impossible but may be willing to pay $150 per month for a number of months. The user may then enter the amount he is willing to pay and request or specify the term for payments. Alternately, if one initial offer is to settle the debt for 20% of the amount outstanding to be paid immediately and financing the remaining 80% over three years at 8% interest per annum, that information may be entered.

The response from the system 100, specifically server 102, depends on the rules established for negotiation. If rules are established to accept an offer of 20% now and 80% over three years at 8% interest per annum, the server indicates that the transaction is resolved and proceeds to request information to obtain the 20%, such as by credit card or from bank account. In most circumstances, the user/debtor is not allowed to go back to the initial offer or offers, and will lose the successive opportunities presented once the user/debtor requests further negotiation.

If rules are established to operate on the negotiation offer presented by the user/debtor, then the decision engine may evaluate the negotiation offer with the assistance of the modules of FIG. 2 to determine a response. For example, if 20% now, 80% over 3 years at 8% is received, the decision engine 206 may obtain rules and/or schemas that indicate the creditor has specified on a "first round" of negotiation, no offer of under 50% immediate payment is acceptable, but if an offer of less than 50% immediate payment is received, the decision engine and other modules are to offer 50% immediate payment and 50% financed at either a 12 or 24 month term at 10%. These counteroffers may be made to the user.

The user/debtor may select an option and resolve the transaction or alternately the server 102 may indicate the offer made by the user/debtor is acceptable to the creditor/credit agency based on the rules provided. At that point, as indicated at point 308, the user/debtor may pay using selected forms of payment and may schedule any agreed upon payments and the form of payment for future payments.

As may be appreciated, at a certain point resolution may be impossible; the user/debtor and the creditor/credit agency rules may not resolve the transaction. At that point, the user/debtor may be presented with an indication that no resolution has been reached and that the user/debtor may contact the credit agency by telephone to further discuss resolution. In any event, the interactive online session at this point includes data that can be saved and used to further negotiations or make decisions based on the likelihood that the transaction can be resolved successfully. If the distance between positions is significant, the credit agency may decide to initiate litigation without further discussions, while another agency may be willing to split the difference and further negotiate by phone or by using the system with different rules. A set of rules and schemas for subsequent offers may be available to enable the user/debtor to logon and further seek to resolve the transaction.

Alternately, if negotiation is offered, the user may be presented with the offer in an editable format and may edit the offer presented in an attempt to resolve the transaction.

If a user/debtor elects to negotiate or offer different settlement terms, the user/debtor may alternately be placed into a collector queue, such as in a chat room or other online device/tool, where the queue may be monitored by a creditor or credit agency having access to server 102. The user/debtor may be notified that his offer has been placed into a queue and that the debtor will be notified (e.g., via chat, test message, or email) when a creditor decision on the offer made has occurred.

If the transaction has been resolved, point 309 indicates the system may process the transaction via a third-party trust account partner. The third party trust account partner is an entity established to oversee and maintain transactions on behalf of the creditor such that the entity operating or controlling the server 102 does not need to be directly involved in the handling of funds. Certain laws may prohibit an entity from maintaining funds in trust for the creditor, banks, and so forth, and thus a third party trust account partner may be employed, but this is optional. Further, if the entity operating or controlling the server is a bank or other permissible holder of funds, a partner may not be needed or desired. At point 310, the system may distribute funds according to distribution rules as discussed above, such as by using payment processing discussed with respect to payment processor 210. Accounting entries may be posted at point 311, and reports generated at point 312.

FIG. 3B illustrates an alternate general flow diagram for the overall system. Point 351 establishes the rules for each appropriate creditor/credit agency and does so by OrgUnit. Point 352 loads the debt portfolio onto system 100. At point 353, the user may be notified of the opportunity to settle an outstanding debt. At point 354, the user/debtor logs onto the system 100 and is authenticated at point 355 and selects a debt at point 356. At point 357, the server 102 seeks to obtain a credit report for the user using credit bureau module 202, and optionally seeks information regarding the debtor from the account/transaction database 118. Depending on the amount of time required to obtain the credit report, the server 102 may either indicate that the user/debtor may return at a certain time and seek the credit report and parse the data before that time, or may obtain the credit report and parse the data using parser module 204. Once the data has been parsed and the user/debtor is available, point 358 causes the decision engine 206 to obtain the appropriate rules for the debt selected, optionally based on the parsed information, and may also obtain schemas and dictionary terms as well as creditor decision criteria if any exists separate from the foregoing. Based on the schemas, rules, parsed credit information, and other appropriate information available from parts of the system 100, the decision engine prepares a set of offers including at least one offer at point 359. The system presents the offer to the user/debtor at point 360. At point 361, the user either selects an offer or selects negotiation if it is offered. If negotiation is available and selected, the user/debtor is able to enter her offer at point 362. At point 363, the decision is evaluated, typically by the decision engine 206 but potentially by a creditor/credit agency representative or other entity, and the counteroffer is either accepted or a further offer is made. At this point, the system cycles back through making an offer based on the rules, evaluating the availability of negotiation and allowing the user/debtor to make a counteroffer if available. The net result as shown at point 364 is either resolution or stalemate.

If resolution occurs, payment processing occurs at point 365, and reporting may occur as required at point 366. As may be appreciated, other aspects discussed herein, such as modifying rules based on portfolio activity, may occur though not shown in FIG. 3B.

Figure 4:
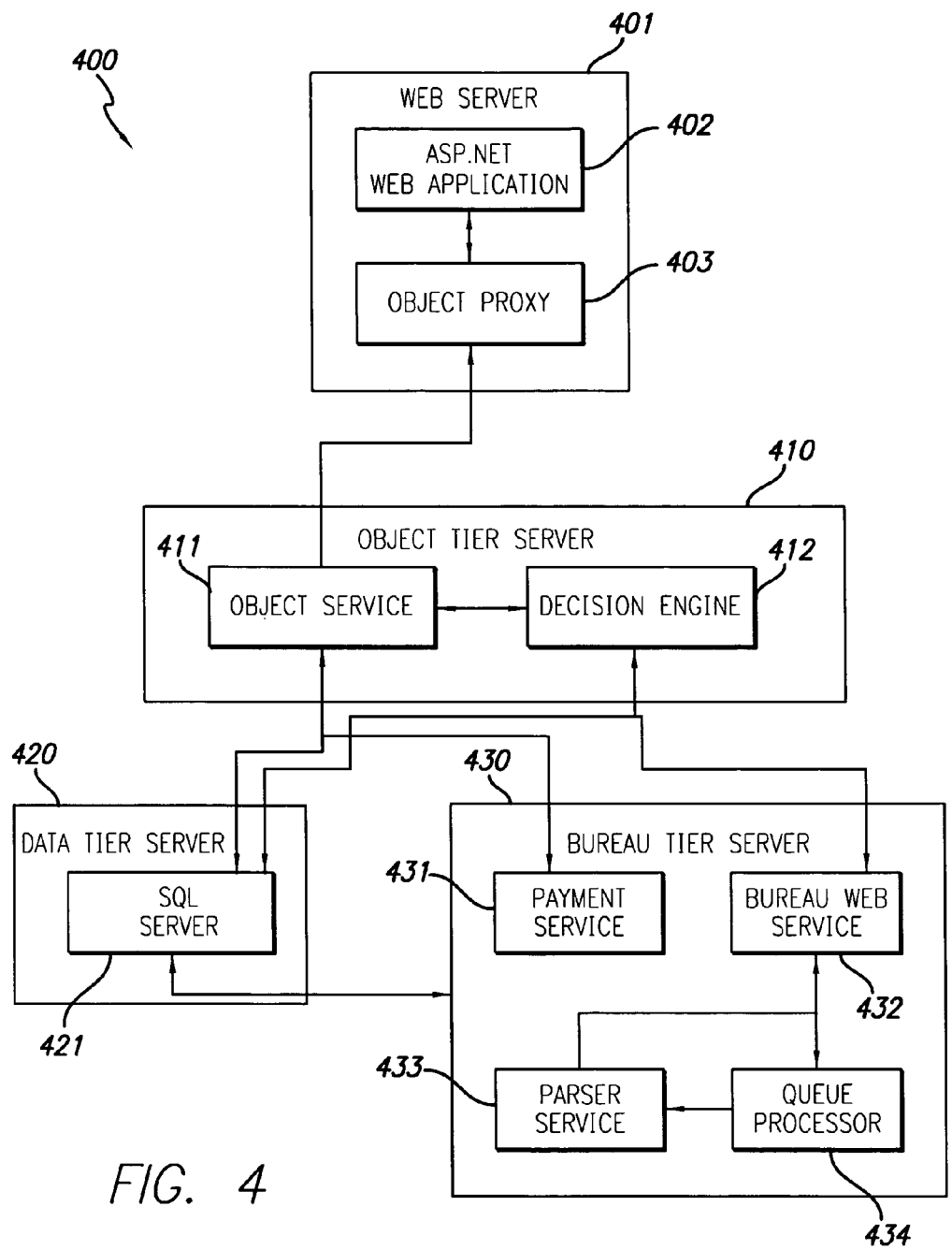
FIG. 4 illustrates an architectural representation of the debtor interaction side of one embodiment of the present design, implemented on a Microsoft platform.

FIG. 4 illustrates an architectural representation of the debtor interaction side of the present design, implemented on a Microsoft platform. The debtor system 400 employs object oriented programming and SQL database operation to effectuate the functionality described above. In general, objects are created or received and operated on while periodically, as necessary, obtaining data for purposes of applying schemas and rules and presenting offers to the user/debtor. The architecture is split into various tiers interconnected with a web server that enables access from the outside world via the internet.

From FIG. 4, web server 401 includes an ASP.NET web application 402 used to interface all appropriate debtor functionality with the internet, such as allowing the debtor to contact the server 102 and interact with the server for purposes of authentication, etc. ASP.NET web applications are typically known to those skilled in the art. Many of the functions of the debtor interface 222 are performed by web server 401. An object proxy 403 is provided to provide the data to and from the web server 401 and the other tiers in the system to effectuate the functionality described herein. The debtor system components beyond web server 401 comprise object tier server 410, data tier server 420, and bureau tier server 430. The object tier creates and receives/translates objects for interfacing with the debtor/user via the web server 401.

Object tier 410 comprises object service 411 and decision engine 412. Object service 411 receives objects and can query the data tier or translate the object as necessary and provide the object to decision engine 412. Much of the functionality of decision engine 206 may be performed by decision engine 412, including assembling the rules and schemas and applying the rules and schemas to parsed credit report information to develop the set of offers made to the user/debtor and subsequent negotiations, if any. As shown, object tier 410 interfaces with both data tier 420 and bureau tier 430 to perform the requisite functionality. The decision engine 412 may seek rules and other information from data tier 420, as may the object service 411. Data tier 420 comprises SQL server 421, typically a SQL server having access to all the rules, schemas, dictionaries, and other data noted above that is stored for use in creating the offers, managing the debt portfolios, and so forth. The object tier 410 further interfaces with bureau tier 430, typically comprising a payment service module 431 used to establish payments resultant from successful transaction resolutions.

Payment service module 431 queues and processes payment transactions, routing them to an appropriate Third Party Payment Processor gateway based on the method of payment (i.e., ACH, CC, etc.), and further based on any contracts or arrangements established between the trust partner OrgUnit and the creditor/credit agency OrgUnit. Creditor/credit agency OrgUnit A may arrange to process credit card payment transactions through one third party payment processor while processing ACH payments through another. The system may enable a creditor/credit agency to dynamically select a payment partner by displaying to the creditor/credit agency OrgUnit the available Trust Partner OrgUnits and their respective Trust and Payment Processing service offerings. The creditor/credit agency can select a Trust Partner and applies for specific payment services. The Trust Partner may then approve or decline the application. Payment service applications may be supplemented by questionnaire data.

Approvals and contract variables such as discount rate, transaction fees, start-up costs, and so forth, may employ decision engine 206 according to rules set up for approvals and contracts, and may result in a payment service contract. Once these contracts are established, the user is presented with payment methods for debt resolution depending on the active payment service contracts the creditor/credit agency OrgUnit has established.

Bureau server 430 further includes bureau web service module 432, used to obtain the data from the credit bureau, such as a credit report, when necessary and provide the credit report for the debtor/user when appropriate. The bureau web service module 432 interfaces with the parser service module 433. The bureau web service module 432 performs much of the functionality described with the logical credit bureau module 202, while the parser service module 433 performs much of the functionality associated with parser module 204 in the logical representation of the present design. The ABS queue processor 434 queues the requests for credit reports and distributes them to the appropriate user/debtor. Hence much of the functionality shown in this FIG. 4 performs the logical functions shown in FIG. 2 performed by decision engine 206, parser module 204, credit bureau module 202, creditor decision criteria 212, debtor interface 222, dictionary 214, and schemas 216.

Figure 5:
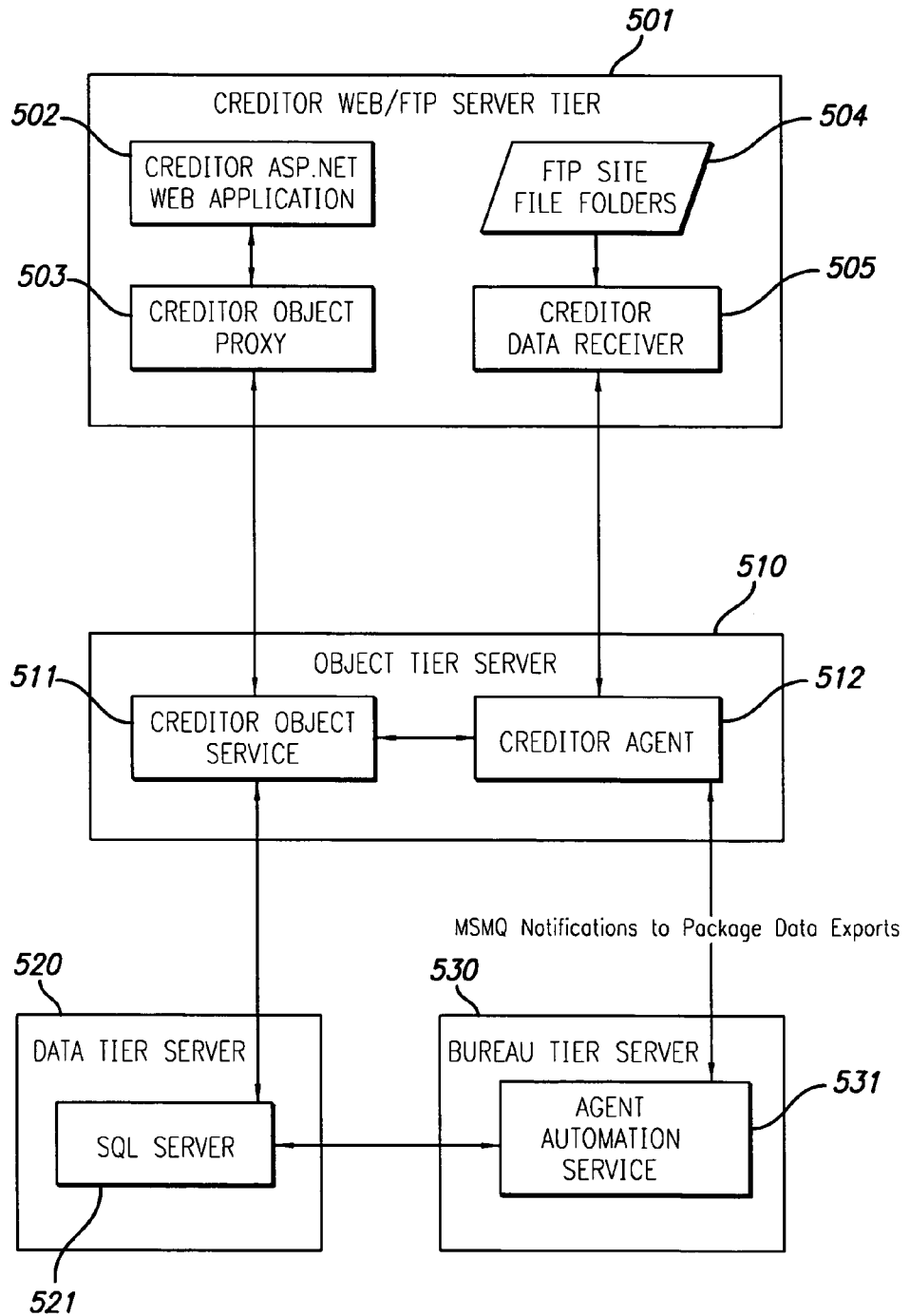
FIG. 5 is one embodiment of a creditor system architecture.

FIG. 5 illustrates the creditor system architecture 500, again including a server tier 501, object tier 510, data tier 520, and bureau tier 530. Creditor system architecture may be maintained separate from any creditor but operates on the creditor side of the transaction resolution process, essentially maintaining creditor data and effectuating creditor related functionality in the transaction. Again, a Microsoft platform employing OOP and SQL is shown in this embodiment. The creditor side enables the creditor, credit agency, or other entity possessing the debt to provide information and enable interfacing with the debtor side of system 100 and facilitate resolution of the transaction. The creditor architecture 500 performs the functions needed for the creditor, such as gathering creditor and debtor data, preparing data used in providing offers, and informing the creditor of transaction resolutions and status, and in certain cases preparing reports where desired.

As with the debtor architecture of FIG. 4, the creditor architecture includes an ASP.NET web application 502 and an object proxy 503 in server tier 501. In addition, the server tier 501 includes FTP components and a data receiver. A creditor, such as a bank, may maintain an FTP site that includes data, rules, or other appropriate information useful in effectuating the transaction resolution process discussed. In order to maintain a level of uniformity, the FTP site file folders 504 maintain at least a list, and in some circumstances the entire file, of data used in the transaction resolution procedure. The presence of these folders can facilitate obtaining the rules, schemas, accounts, debts, and so forth used by the system 100. A creditor data receiver 505 is provided in server tier 501 to write received data to the creditor's FTP site folders. Alternately, the creditor data receiver may transmit packages of data directly via email or a secure web service to other components of the system 100. The FTP site file folders 504 and creditor data receiver 505 enable advantageous connections directly to and from the creditor, and receive data from and transmit data to creditor agent 512.

Object tier 510 comprises a creditor object service 511 and creditor agent 512. Data objects are received by and transferred from this tier. The creditor object proxy 503 may receive and transmit objects for processing or after processing for use on the debtor side of the system architecture. The creditor agent 512 creates and encrypts data exports bound for creditors, transmits encrypted files to the creditor data receiver 505 running on the server tier 501. Data tier server 520 again maintains a database and data interaction occurs on this tier 520 using SQL server 521. Data is of course related to the creditor and creditor related data is retrieved and transmitted using this SQL server 521. Bureau tier server 530 comprises agent automation service 531, which executes scheduled events, such as open of day, close of day, end of month, and other processing and accounting requirements. The agent automation service 531 communicates with external payment processors and other appropriate devices to monitor active transaction status, download batch reports, and perform other creditor related functions. The transaction state may be updated in SQL server 521, creating change logs and current status. The bureau tier server 530 may communicate with the object tier server 510 using MSMQ (Microsoft Message Queueing) notifications to prepare and export data packages. Agent automation service is less extensive on the creditor side than the functions performed in the debtor bureau tier server 430, and simply automates scheduled events for assessing status and preparing information relating to reports.

Figure 6:
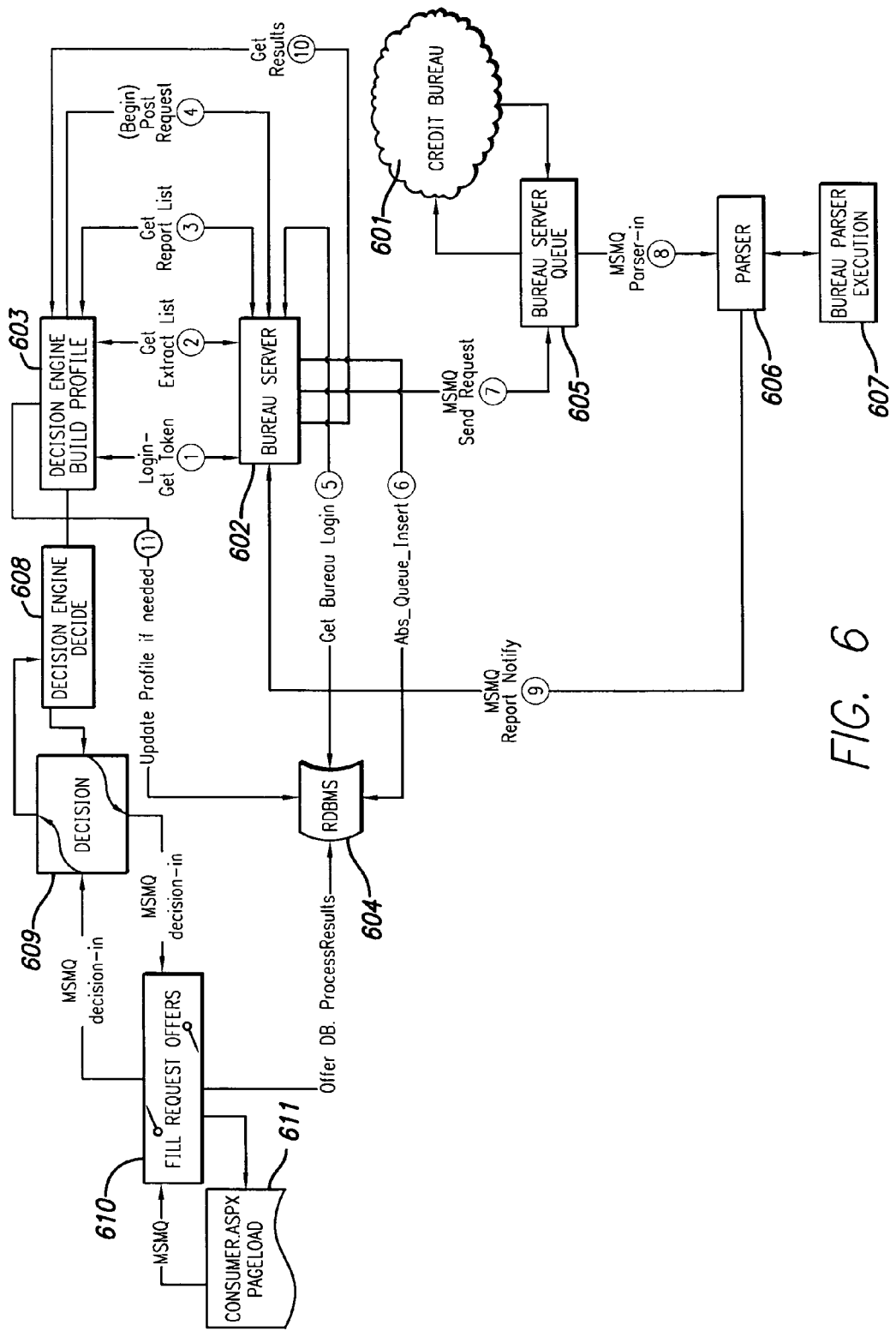
FIG. 6 shows an alternate embodiment of system operation representing an embodiment of the present design.

FIG. 6 illustrates an alternate embodiment of system operation, or the decision flow, specifically including many of the logical software components of system 100. From FIG. 6, credit bureau 601 represents the credit bureau from which credit reports may be obtained, generically representing all credit bureaus that may be contacted by the system 100. Operation is sequential through the numbers encircled, and decision flow operation is generally directed by bureau server 602. The first process is to login and obtain a token for a session for purposes of authenticating the session, where the session is on the bureau server 602. This information passes to both bureau server 602 and decision engine build profile module 603. Process 2 obtains an extract list, or a list of data to be extracted, while point 3 obtains a report list, or a list of data to be reported by server 602. The extract list and report list are typically credit bureau specific, and these decisions are generally as discussed with respect to credit bureau module 202 and creditor decision criteria 212 above. For example, an extract list for credit bureau A may include the information stored as rules and/or schemas including credit score, debtor first name, debtor last name, most recent bankruptcy filed, number of payments made more than two months delinquent, total cash on hand in all accounts, etc. The report list may be the information to be reported to the credit bureau, such as successful transactions, resolved debts, payment arrangements, and so forth.

Decision flow essentially proceeds from point 4, posting a request, generally a request for a credit report from a particular credit bureau, potentially based on the extract list and possibly the report list. At point 5, the bureau login is obtained by the bureau server 602 from RDBMS (relational, database management system) 604. Point 6 inserts the request in the bureau server queue, relying on the RDBMS 604 for present queue information and data relating to entry of additional requests in the queue. Once the bureau server 602 has the queue information, it sends a request, by MSMQ or other appropriate transmission mechanism, to the bureau server queue 605. Bureau server queue 605 may be executed in a desired order, and eventually the request made results in a credit report being obtained from credit bureau 601. Once the bureau server queue 605 has obtained the credit report, point 8 indicates that the data is transmitted to parser 606 for parsing the relevant data from the credit report received. Block 607 represents the parser execution logic. Once the parsing has occurred, a report-notify indication is provided from parser 606 to bureau server 602 at point 9. Armed with the parsed information, bureau server 602 then transmits at point 10 a request to get results to decision engine build profile module 603. Decision engine build profile module 603 builds a profile of the debtor based on the parsed credit bureau information or credit report, the extract list, report list, and relational database entries. The decision engine build profile module 603 at point 11 may update the particular debtor profile if certain credit information has become available, entering the additional information in the RDBMS 604.

The decision engine decide module 608 combined with the decision engine build profile module 603 generally forms the decision engine 206 in FIG. 2. The decision engine decide module 608 may produce a set of criteria or offer specifics approved by the creditor/credit agency based on the circumstances presented. Decision module 609 essentially receives the information and provides/converts the information received into specific offers, and provides the decision in the form of decision results, typically in MSMQ but potentially in other message formats.

While shown as two separate modules (decision engine decide module 608 and decision module 609) in FIG. 6, referring to FIG. 2, the decision engine 206 contains the Decide function. Thus the two modules 608 and 609 illustrated in FIG. 6 could be combined into a single decision module. Note that FIG. 6 illustrates various subfunctions within the decision engine 206, including BuildProfile, which communicates with the real-time external data source module, and the aforementioned Decide, which applies the rules to the compiled profile, generating offers as a result.

The MSMQ decision results message from decision module 609 is provided to fill request offers module 610, wherein fill request offers module 610 is an offer database holding the offers previously made and queues the set of offers for transmission to the user/debtor. The user/debtor receives the set of offers via consumer ASPX pageload module 611, which loads the pages for transmission to the user/debtor. Any responses are received by the system at the consumer ASPX pageload module 611, which may transmit the received response in MSMQ or other appropriate message format to fill request offers module 610. At this point, when an offer or set of offers or other selection offered on the page has been acted upon by the user/debtor, and the decision received may be transmitted from fill request offers module 610 to decision module 609 and to decision engine decide module 608. The result is an appropriate action (negotiate, consider the transaction resolved, negotiation/session terminated, etc.) according to the rules established, including the possibility of transmitting further sets of offers where approved. Note that RDBMS 604 may be updated by process results from fill request order module 610, namely results of approval and resolution of transaction, negotiation/session terminations, etc.

Figure 7:
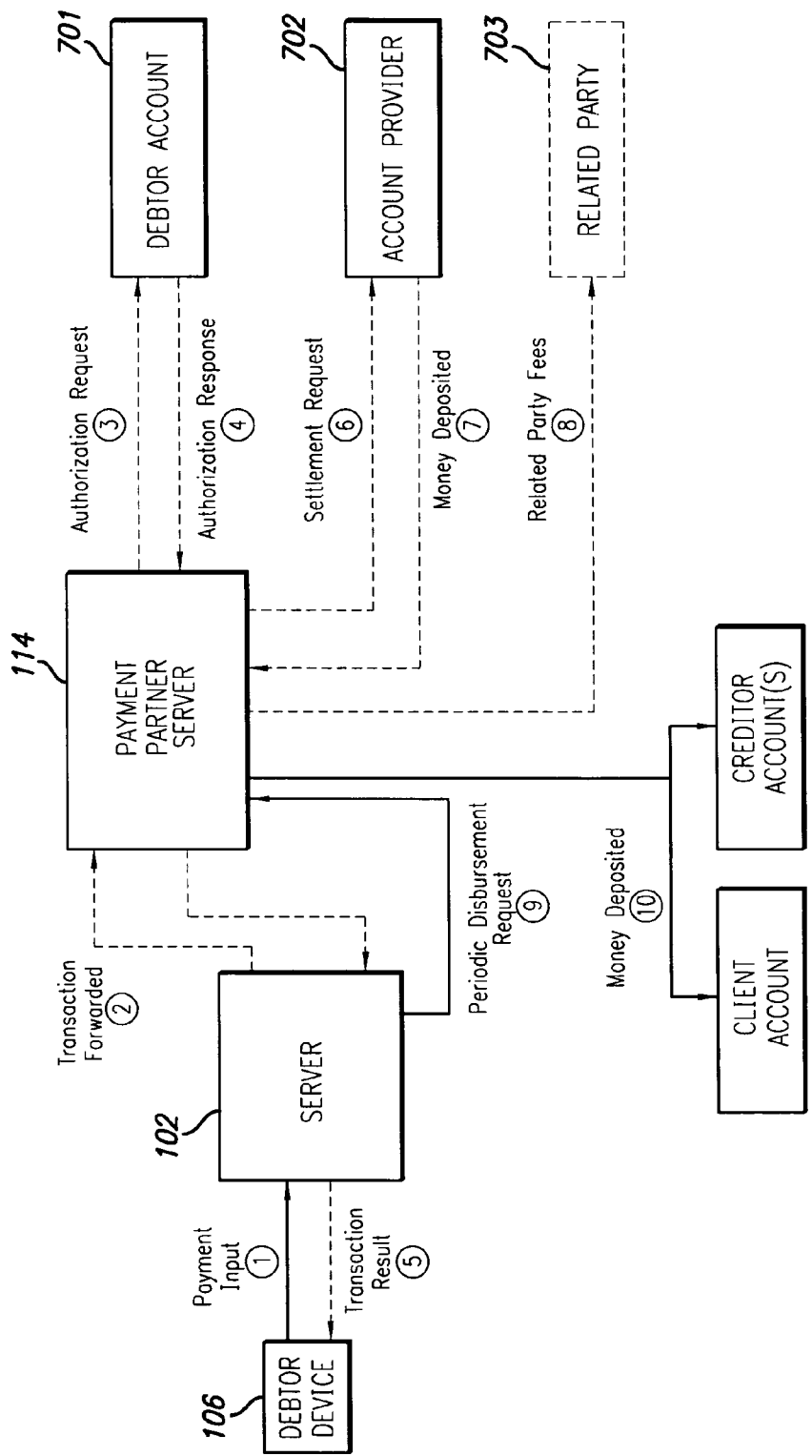
FIG. 7 illustrates an embodiment of a payment partner server transaction flow.

FIG. 7 illustrates a payment partner transaction flow 700 implemented, for example, using payment partner server 114. The third party payment partner supplies functions such as ACH (automated clearing house) processing, funds clearing and disbursement services to creditors/clients. The third party payment partner receives funds on behalf of clients, such as banks, credit grantors and collection agencies, and holds and/or clears funds on behalf of clients. The system 100 can deposit funds into a third party payment partner's trust account by submitting all transactions electronically via the interne, for example. The client-creditor can interface with the third party payment partner using the system by specifying rules and schemas according to which the terms, conditions and fees of the third party payment partner is to handle funds. For example, if the funds are to be held for 3 days or until approval has been received from the creditor before being transferred to account J, the third party payment partner holds and acts on the funds according to the rules provided. Again, rules may be implemented by the entity maintaining the server 102 separate from the creditor, credit agency, or payment partner, such as governmental regulations, usury requirements, and other appropriate data.

The third party payment partner typically can process debit cards, Master-Money cards, ACH, EFTs, and can originate transactions on behalf of clients-creditors as instructed by the client and/or its customers, can hold funds received from client's customers on behalf of the client for a fixed amount of time, such as up to 30 days, and can distribute funds to client accounts according to a client's electronic instructions, based upon electronic distribution rules maintained on the system and set up by or on behalf of the client.

Stepping through FIG. 7, the user/debtor employs his or her user interface device 106 to provide a payment, such as in the form of an EFT or credit card information at point 1. Server 102 receives this payment input and forwards the transaction to payment partner server 114 at point 2. The payment partner server issues an authorization request requesting authorization from the appropriate debt vehicle, such as the checking account, savings account, credit card issuer, and so forth, or account 701, at point 3. Point 4 is an authorization response, either authorizing the transaction or denying the transaction. If the transaction is denied, the payment partner server may transmit this information to server 102, which may act according to predetermined rules in situations where payment is refused, such as by altering the offer to only payments made over time, refusing to produce any further offers and terminating the session, or other desired action. Whether or not the transaction is approved, point 5 indicates that the transaction result is provided to the user/debtor by server 102. If the transaction is approved, payment partner server 114 provides a settlement request at point 6 to a bin account provider or merchant account provider, and an indication of money deposited is made by the provider 702. Any fees to any related party are allocated at point 8, where a related party 703 is a party related to the resolved transaction, including but not limited to the entity maintaining the server 102. Point 9 indicates that certain disbursements may be requested by the server 102 to payment partner 114 on a periodic basis, such as weekly or monthly, and point 10 indicates monies are deposited into client accounts 704 or creditor accounts 705 according to the rules established.

Offers are not limited to simply financial terms. Each offer or set of offers discussed above may also include non-financial terms such as the offer of a free product or service or, for example, some other type of convenience or right. The offering of these non-financial offers may be governed by one or more rules considered by decision engine 206. For example, if a free product is offered for resolution of the transaction at 95% of the outstanding debt, a user/debtor owing $1000 may be presented with a set of offers including an offer to resolve the transaction for $950 plus a free version of his credit report, and this data may be presented to the user/debtor for selection.

As an option that may be used with the system 100 presented above, a user/debtor interacting with server 102 may improve his credit score substantially in real-time while online with server 102. For example, the user/debtor may make a payment on a debt using the system 100. The payment is received and acted upon as shown in FIG. 7, and thus server 102 has approval of the funds being available and transferred.

From FIG. 1, server 102 may report the satisfaction of payment to creditor server 104 and/or credit bureau server 116. Upon receiving a report that a debt has been satisfied, the credit bureau server 116 may take payment of that debt into account and may recalculate the credit score based on the user/debtor's current score. Computation of a credit score takes into account a variety of factors and different credit bureaus may compute different credit scores with identical data, but in general satisfaction of an outstanding debt is a positive factor that may increase a user/debtor's credit score. If the credit score can and has been calculated, the credit bureau server may transmit the updated credit score back to the server 102 for transmission and display to the user via debtor device 106. Alternately, the server 102 may understand generally how payment of a debt may affect credit score and may compute a provisional or temporary credit score for the user/debtor based on the amount of debt satisfied and the conditions of satisfaction (immediate payment, payment over time, etc.). For example, if based on an entire credit history having a few delinquent debts and one bankruptcy five years previously, the debtor's credit score is 612, satisfaction of an outstanding $2000 debt may raise this credit score. For example, if payment of an outstanding debt for a debtor having a total outstanding debt of between $20,000 and $30,000 and a credit score between 610 and 620 typically raises the credit score by four points, the server 102 or the credit bureau server 116 may indicate that the user's credit score either may or will increase to 616.

Figure 9:
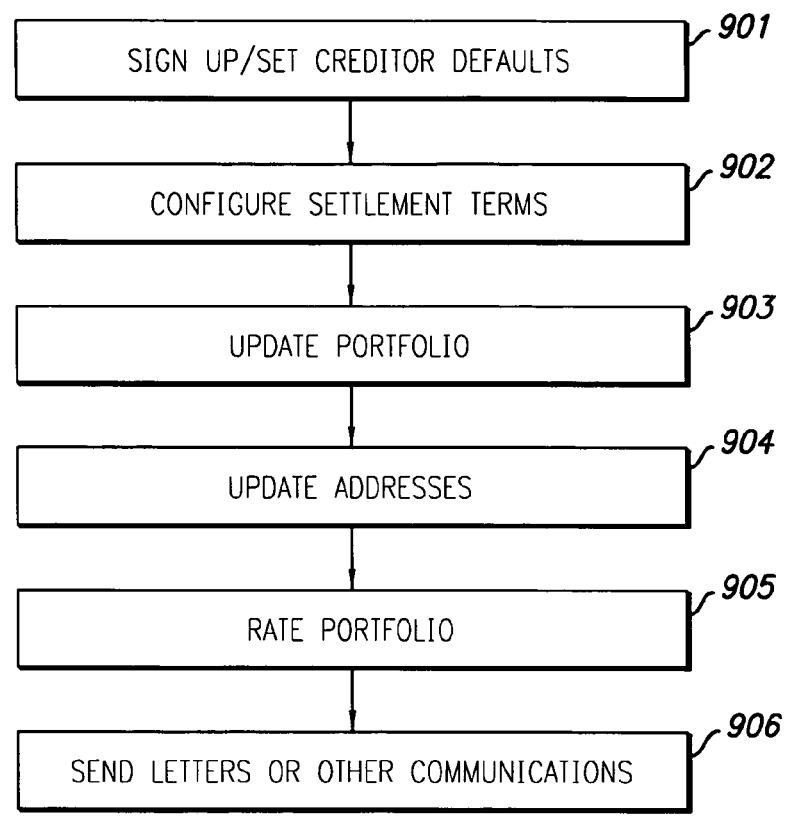
FIG. 9 illustrates a general creditor/credit agency workflow in accordance with the present design.

FIG. 9 illustrates a general creditor/credit agency workflow for the embodiment disclosed with respect to, for example, FIGS. 1 and 2. Point 901 establishes the creditor/credit agency account with server 102 and establishes a general set of defaults for the creditor. Point 902 configures settlement terms for the creditor/credit agency, such as by either providing them verbally to an entity that can translate them into server appropriate terms, such as APX, scripts, or other appropriate settlement terms. Point 903 uploads the debt portfolio, typically from creditor server 104 to server 102 via communications medium 108. The portfolio includes all debts and identifying information relevant to the debts, potentially including but not limited to debtor name, account number, debt amount, date incurred, and so forth. Debtor addresses may be uploaded at point 904, again from creditor server 104 to server 102. An optional portfolio rating may be provided at point 905 to rate the portfolio using an established rating system. For example, a portfolio may be rated with letter grades (A, B, C, D, etc.) with A being the best portfolio by some subjective measure. Number ratings may also be employed (1 for high risk, 2 for medium risk, 3 for low risk, for example) or other rating. These ratings may be used in certain subsequent rules when developing offer sets. For example, a high risk portfolio may be granted a minimum financing rate of 12 percent per annum, while a low risk portfolio may be granted a minimum financing rate of 8 percent. These ratings may change as desired. Point 906 indicates a communication with the debtors, such as by mail, email, text message, recorded phone message, or other means, thereby initiating contact with the debtor and beginning the transaction resolution using the current system 100. Note that debtor addresses may be periodically updated, portfolios re-rated, and letters sent by the creditor/credit agency, the entity maintaining the server 102, or other appropriate and/or authorized entity.

Figure 10:
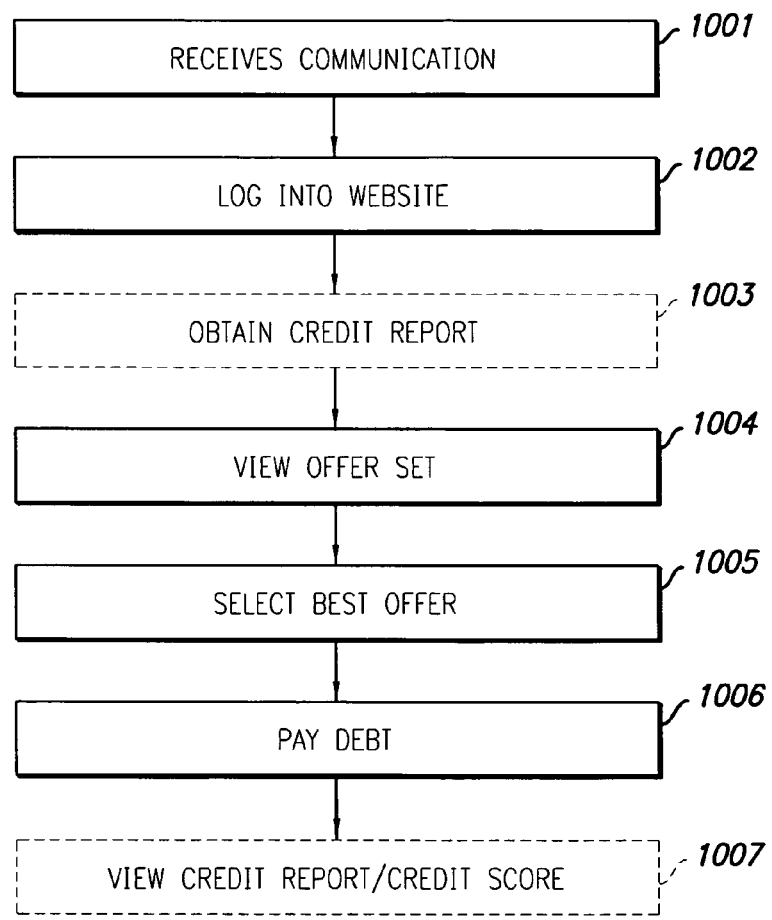
FIG. 10 is a general debtor workflow in accordance with the present design.

FIG. 10 illustrates a general debtor workflow. At point 1001, a debtor receives a letter or other communication providing the web site of the server, perhaps identifying a specific debt or creditor, and perhaps providing a key word or password or code know to and enabled to be used at the web site of the server 102. The debtor at point 1002 may log onto the web site, using his key word, password, or code as appropriate. In certain circumstances and jurisdictions, an individual or entity may need to approve an entity such as a creditor, credit agency, or entity maintaining server 102 obtaining his credit report. In such case, a credit report may be approved by the user indicating the obtaining entity is authorized to obtain a credit report on his behalf, shown as an option at point 1003. Rules may be established when a user does not allow a credit report to be obtained, or no credit report is available, wherein, for example, no offers are to be made, or alternately, only a limited set of offers (such as 100 percent of debt outstanding) may be presented. These rules are established by either the creditor/credit agency or entity controlling server 102. After a period of time, which may be short or long depending on circumstances, the user/debtor may receive and view offers at point 1004. The user/debtor may select the best offer at point 1005, and may pay debt at point 1006. An option that may be made available is for the user to view his/her credit report, by purchasing it or other available options, and may view his or her credit score in certain instances if offered at point 1007.

To provide a general feel for the type of screens that may be encountered/used by the entities accessing the system, a general set of screen shots is presented in FIGS. 11-22. These screen shots represent a general illustration of the present design, but alternate views, information, and layouts could be presented, and thus the screen shots presented here are not intended to be limiting.

Figure 11:
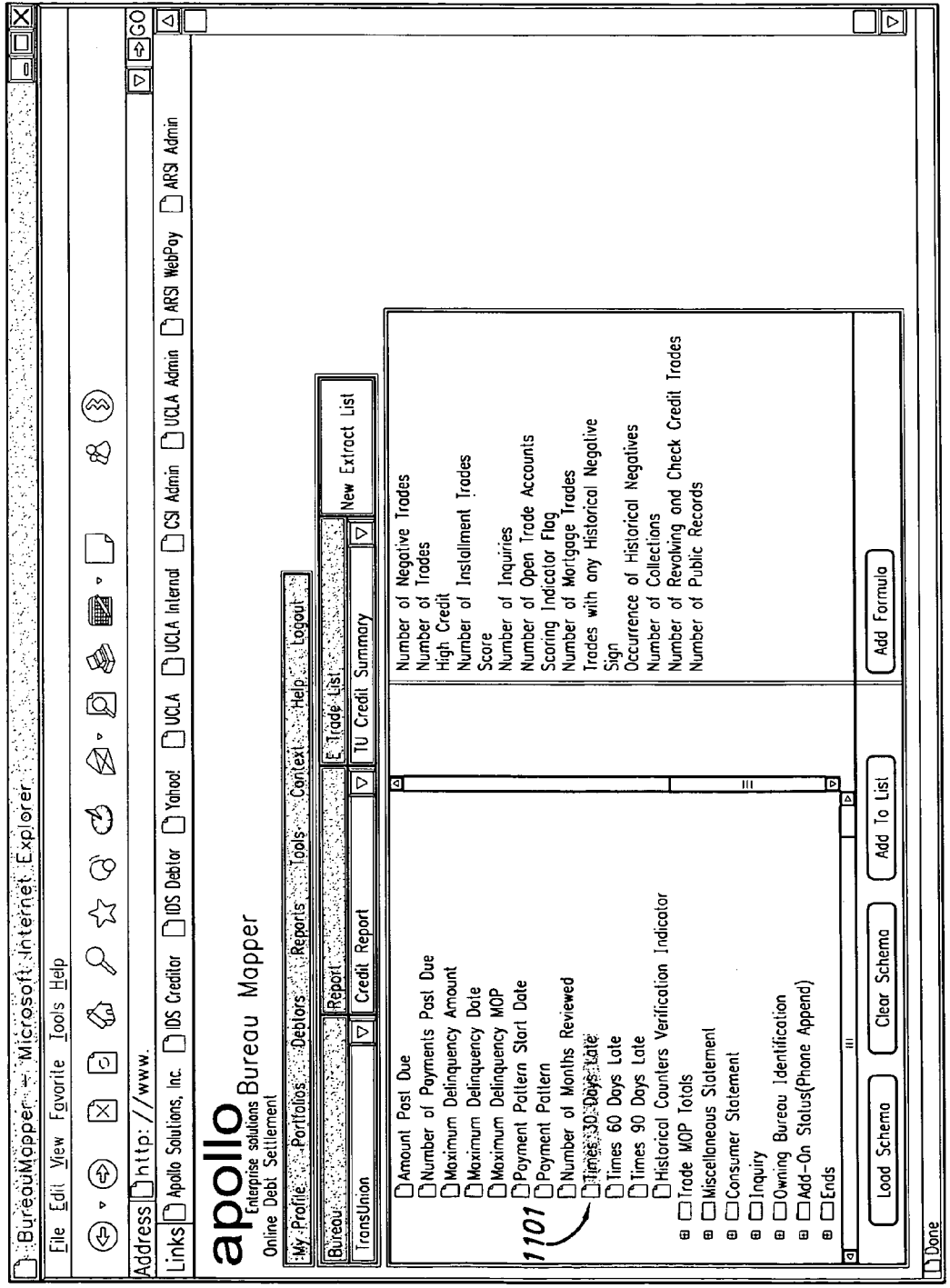
FIG. 11 shows an internet browser screen shot having settlement items particular to a credit bureau.

FIG. 11 shows an internet browser having settlement items particular to a credit bureau. In general, the bureau mapping function is being addressed in this screen, namely how the credit bureau module 202 obtains the credit report from the credit bureau 116. The bureau mapping screen 1101 indicates the bureau name, the type of report, an extract list, and provides a listing on the right side of the bureau items to be extracted from the report retrieved (number of negative trades, number of trades, high credit, etc.) An operator at this screen can select from the available fields on the left side of the screen, selecting the fields he or she wishes to include from the credit bureau module and potentially parse using credit bureau module 202 and parser module 204. Again, schemas express shared vocabularies and allow machines to carry out rules. The schema for this creditor may include the rules to extract the desired information from a credit report.

Figure 12:
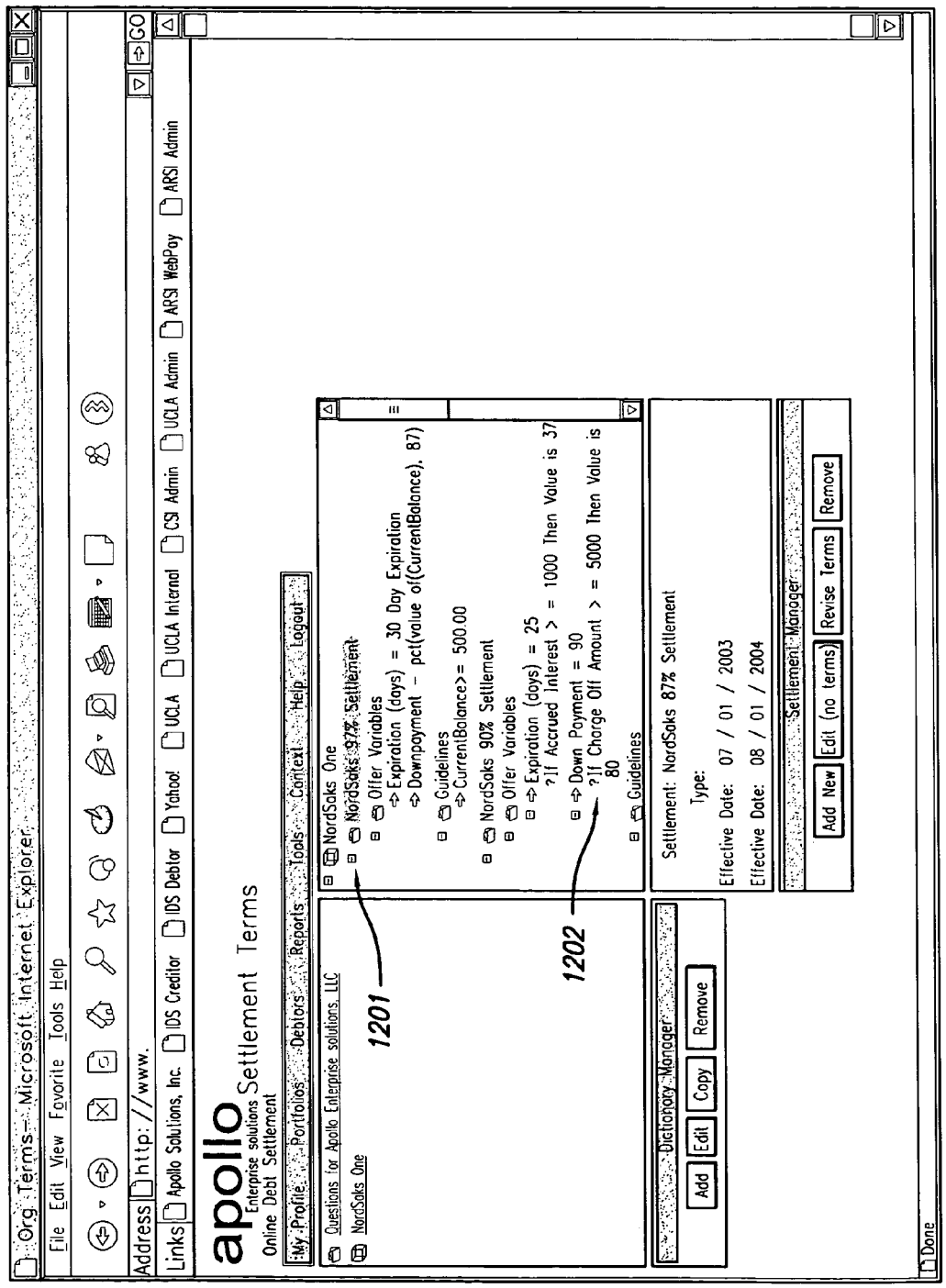
FIG. 12 presents a general set of settlement terms for a particular creditor or credit agency.

FIG. 12 presents a general set of settlement terms for a particular creditor or credit agency. Screen 1201 includes the entity name (creditor/credit agency), and includes different levels of rules, such as a 87 percent settlement and a 90 percent settlement. Offer variables include expiration of 30 days or 25 days in the two circumstances, and guidelines include rules wherein if the current debt balance to the creditor is greater than or equal to $500.00, the amount can be paid off at 97 percent over 30 days. If the accrued interest is greater than or equal to $1000.00. If the charge off amount is greater than or equal to $5000.00 then the value offered is 80 percent. The offers and guidelines 1202 can be altered, and terms added, removed, or changed depending on the desires of the creditor/credit agency or other entity. Effective dates and expiration dates can be provided. Note that an option to add terms to a dictionary is provided in screen 1201.

Figure 13:
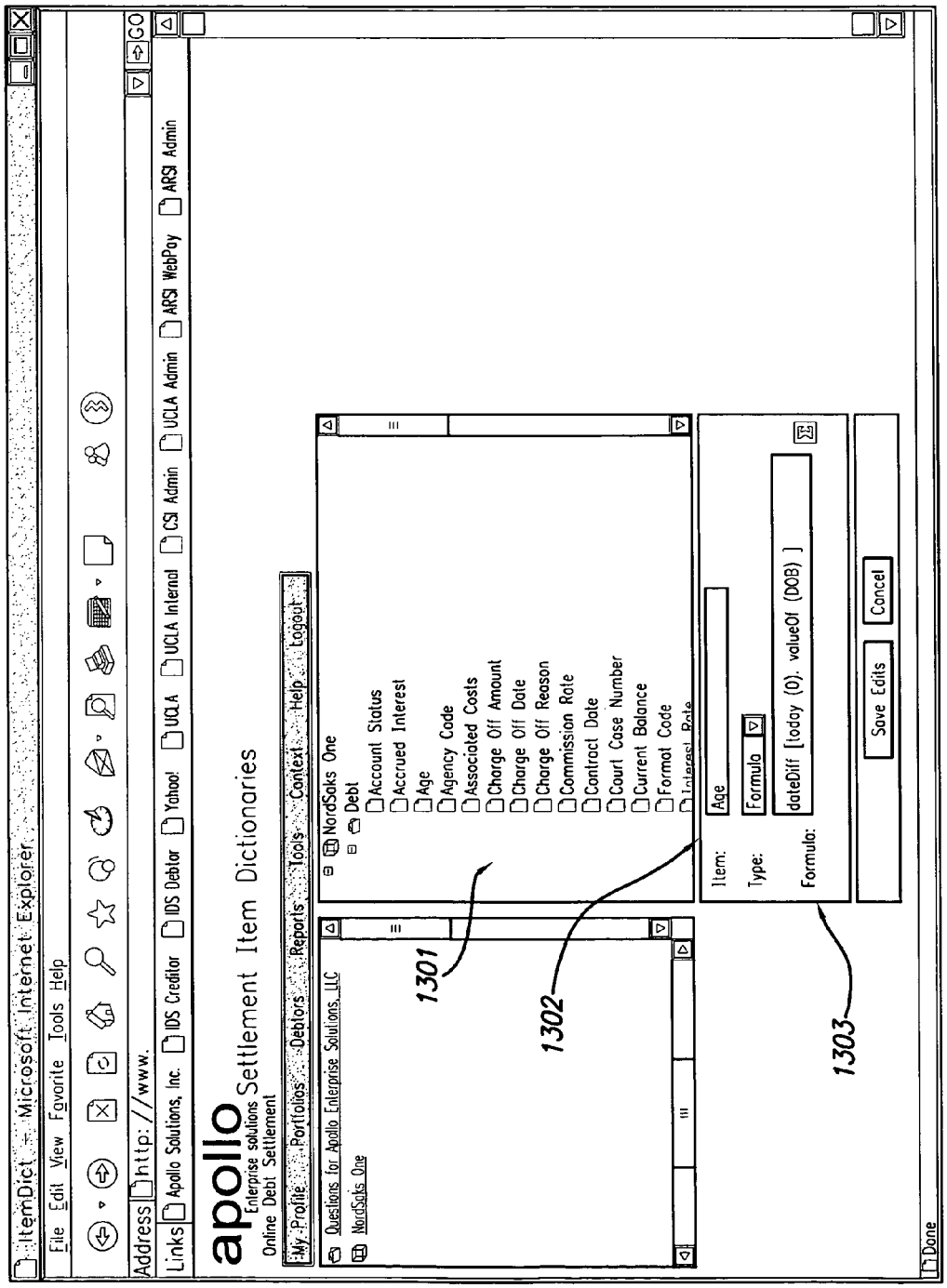
FIG. 13 illustrates a settlement dictionary, including in this embodiment an option to create and edit debt settlement items and assign tags, such as XML tags, to match source data.

FIG. 13 illustrates a settlement dictionary 1301, including in this embodiment an option 1302 to create and edit debt settlement items and assign tags, such as XML tags, to match source data. The various debt settlement items in this view include, under the specific creditor and the dictionary "Debt,"

the entries Account Status, Accrual Interest, Age, and so forth, each representing a dictionary term that can be matched to a credit report entry or other database entry. Point 1302 includes the item or tag, for example in XML format, its type, and point 1303 indicates that the item "Age" can be created using a formula, such as "Current Date" minus "Debt Date."

Figure 14:
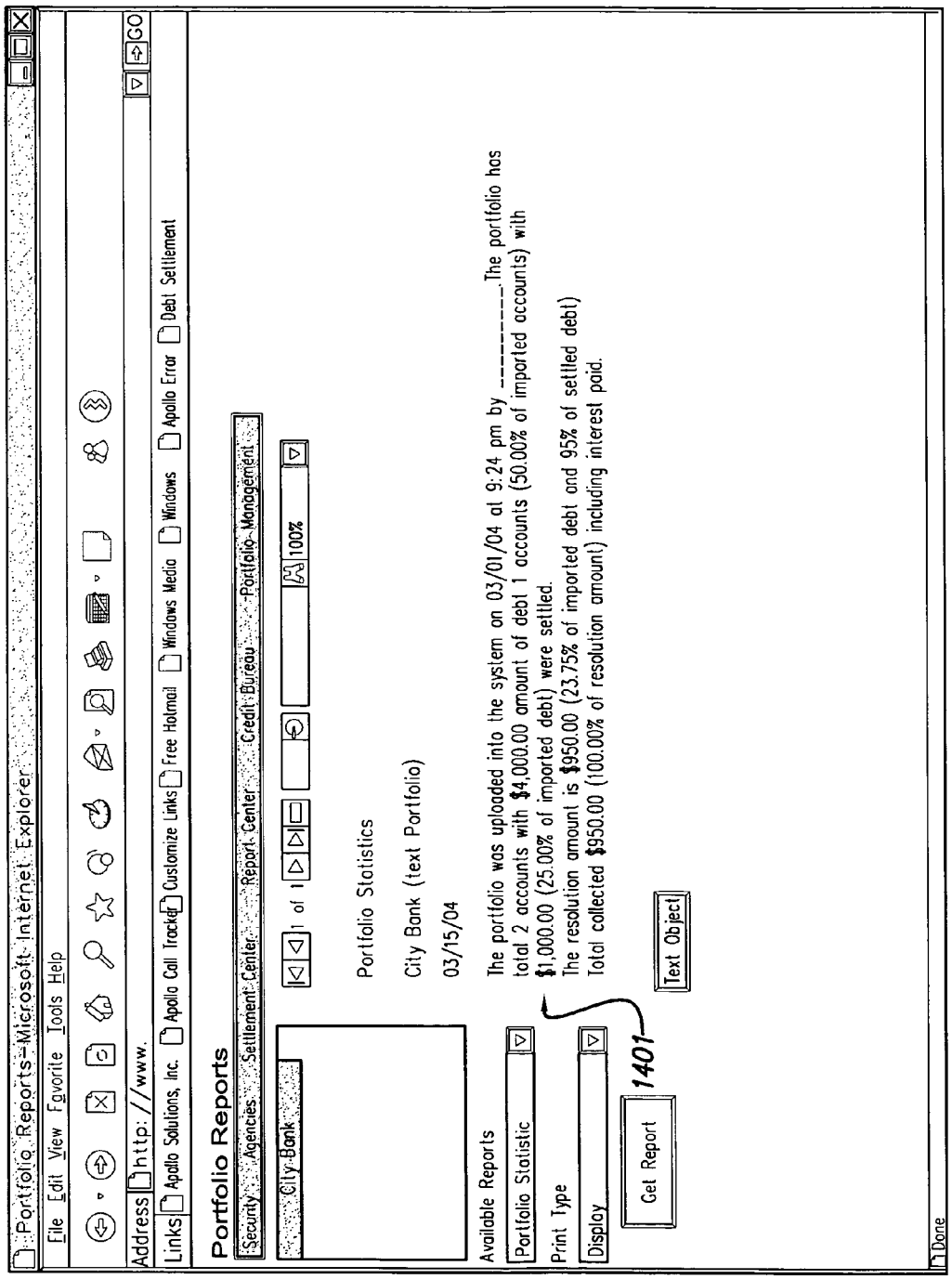
FIG. 14 represents a general format for reports, specifically reporting collection statistics for a debt portfolio.

FIG. 14 represents a general format for reports, specifically reporting collection statistics for a debt portfolio. In this view, at point 1401, the date and time are provided, the number of accounts in the portfolio, the total debt amount, number of accounts that have settled, percentage of accounts settled, amount of debt settled, percentage of all debt settled, resolution amount, percentage of total debt settled, percentage of settled debt settled, total collected, and percentage of transaction resolution amount. Reports can be provided in various formats.

FIG. 15 illustrates a general blank form including fields that may be filled with settlement offer data and presented to a creditor for purposes of issuing settlement offers. Inputs may include account number, status, name, original creditor, principal balance, current balance, sets of available settlements, proposals received from debtors, and counter offer. The screen shot of FIG. 15 may be presented to a creditor if the creditor wishes to have an ability to dynamically make settlement offers to the debtor. In this view, four editable fields are presented as well as two calculated fields. A creditor/credit agency having the screen of FIG. 15 before her may know the specifics of the debt and the state of negotiations to date, and may enter a down payment, a term, an interest rate, and an expiration rate, which may be received by server 102 and presented to the user/debtor via debtor device 106. The "calculate" option calculates the monthly rate and total of debt paid using a specific term and interest rate entered, while "Submit to Debtor" allows the creditor/credit agency to send the offer to the creditor via server 102. Note that if the offer violates any rules for the creditor/credit agency, such as being too low an interest rate for the circumstances presented, the server 102 may present the creditor/credit agency with a warning. Again, the offers correspond to the set of rules, wherein one rule may be that offers submitted by a live person via an interface such as that shown in FIG. 15 override all other rules.

Figure 16:
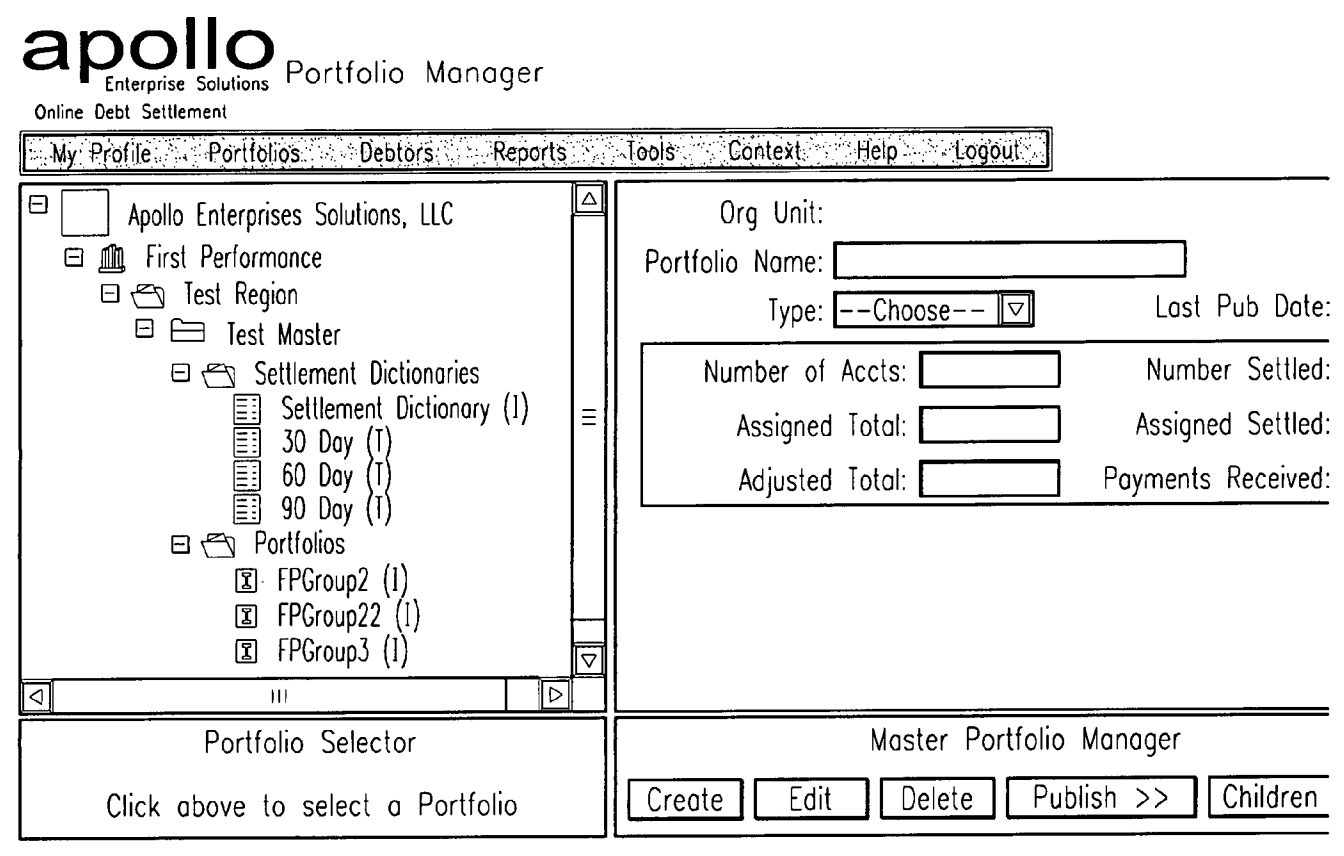
Figure 17:
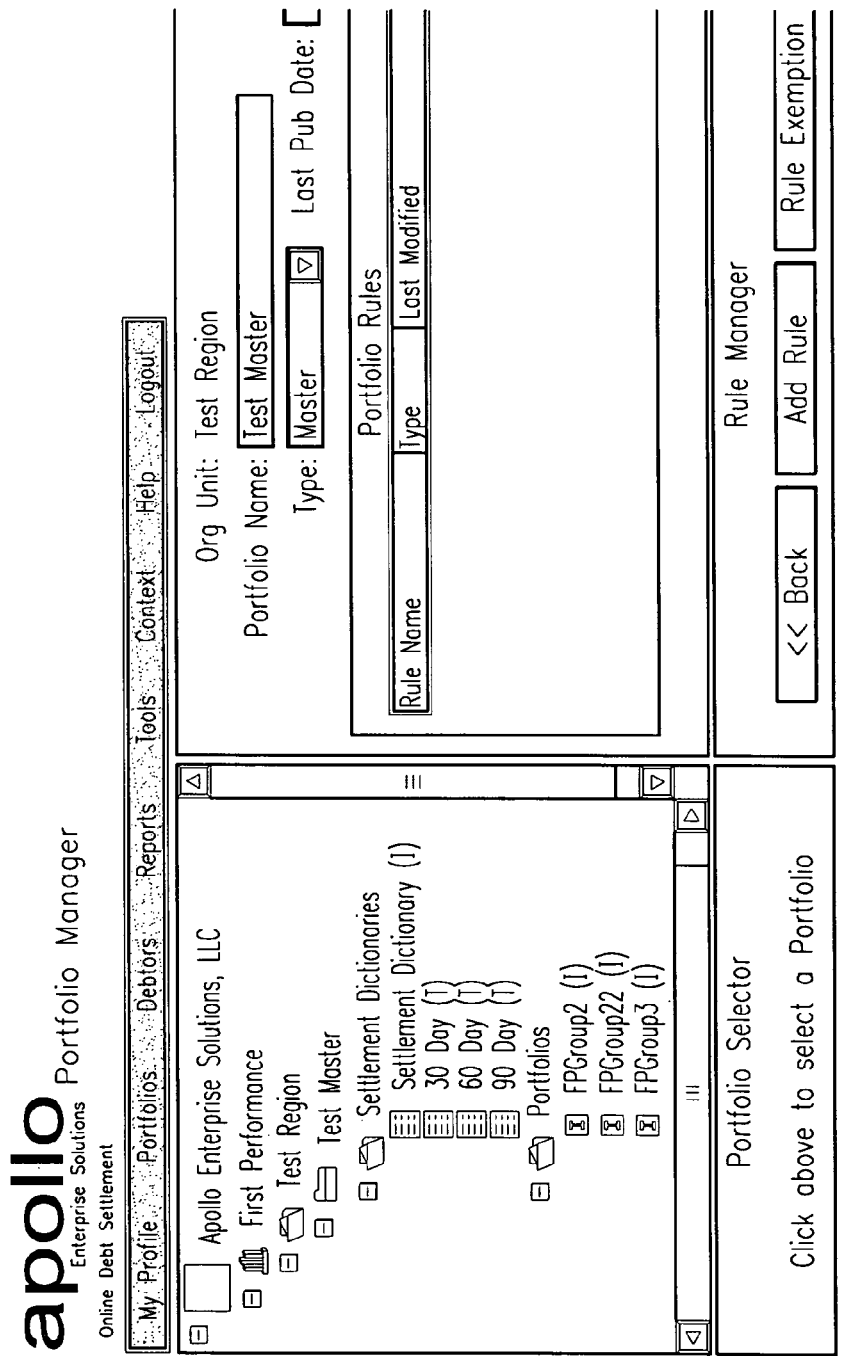
FIG. 17 is shows a rule manager for a portfolio created by the system.

FIG. 16 illustrates a portfolio manager and shows the concept of OrgUnits. In FIG. 16, Test Master is a portfolio of Test Region, which is a sub-OrgUnit of First Performance. Test Master includes various settlement dictionaries and portfolios, and to the right is the OrgUnit, portfolio name, number of accounts, assigned total, adjusted total, number settled, assigned settled, and payments received. This enables a user to create a new portfolio or modify an existing portfolio. As noted, sub-OrgUnits can inherit the properties of parent OrgUnits. FIG. 17 shows a rule manager for the portfolio created, where rules can be added to a portfolio as desired. For example, for OrgUnit Test Region, Portfolio name Test Master, rules can be created for settling debt or transferring debt, such as the portfolio cannot offer an interest rate of less than 8 percent per year and can be sold to an entity offering over 50 cents on the dollar.

Figure 18:
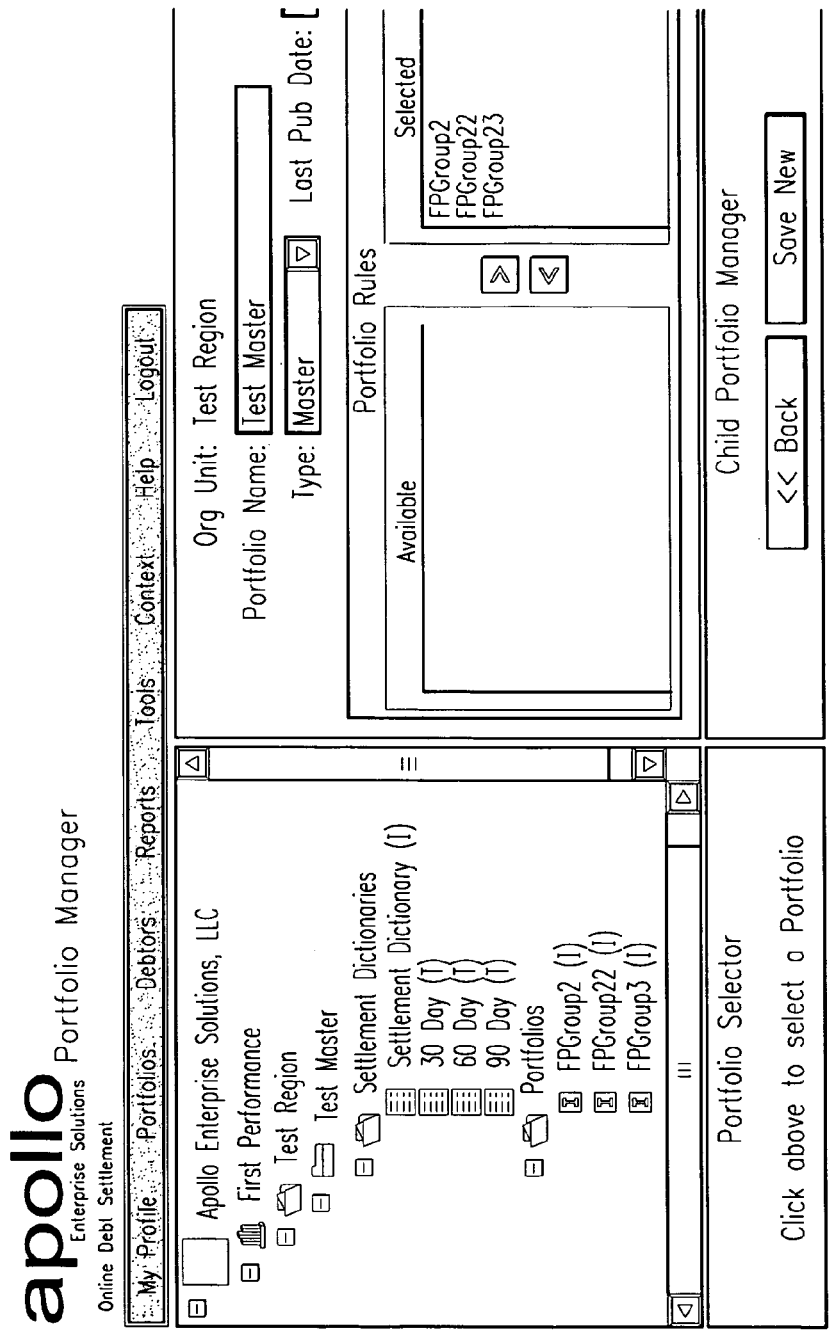
FIG. 18 illustrates the concept of child portfolios.
Figure 19:
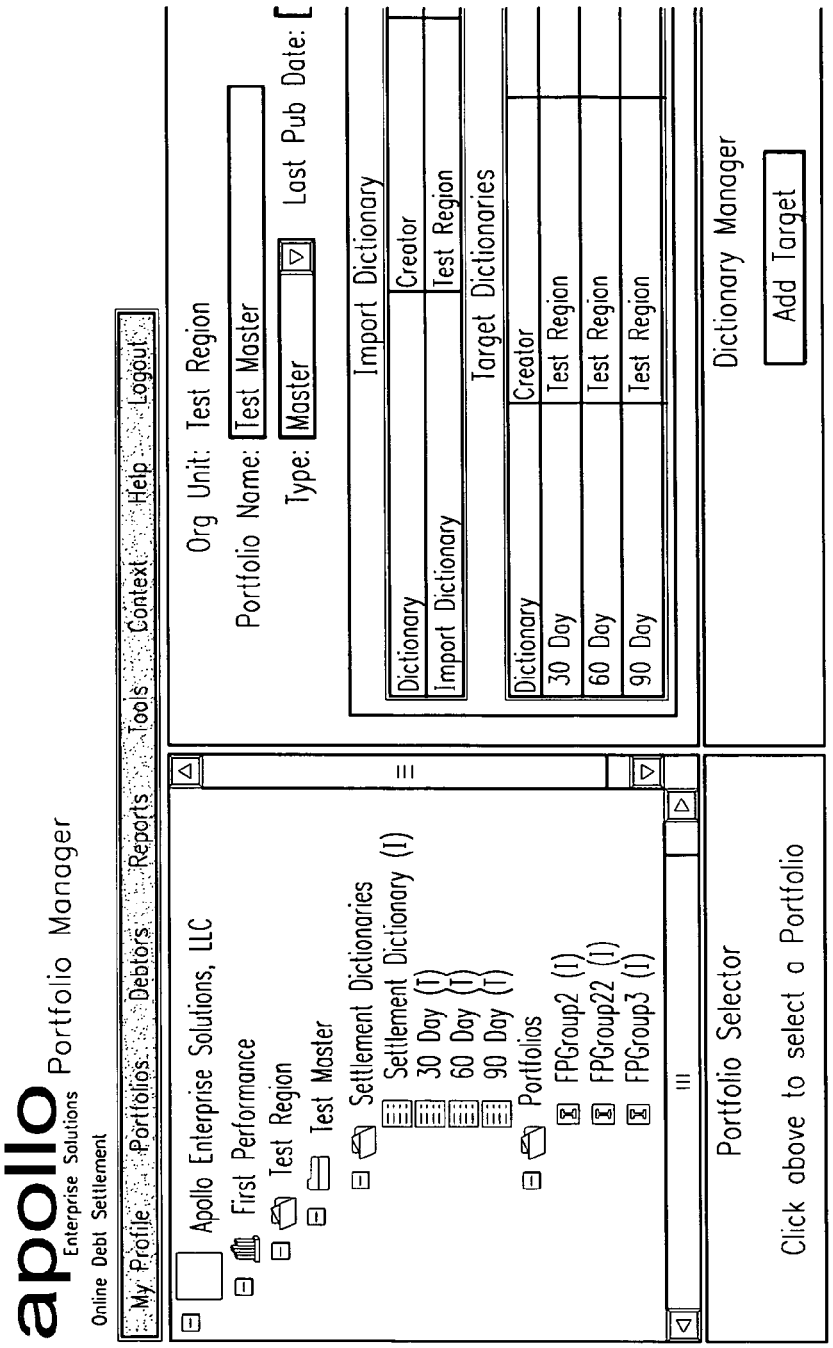
FIG. 19 shows a dictionary manager screen.

FIG. 18 illustrates the concept of "Child Portfolios," where additional portfolios may be added. In this view, FPGroup 2, FPGroup 22, and FPGroup3 are child portfolios of Test Master. Child portfolios may inherit the attributes and rules of the parent portfolio, and may have different or additional rules. Child portfolios enable categorization and metrics to be measured for sub-segments of portfolios, and can portray a better picture of the debt settlement position for the portfolio. FIG. 19 shows a dictionary manager screen, where a dictionary may be imported for a portfolio. In this instance, 30, 60, and 90 day dictionaries are available, where the time period represents the delinquency time of the debts in the portfolio. These dates can represent maximum, minimum, average, or other time periods of delinquency. For example, for a debt over 30 days old, the 30 day dictionary may apply, where such a dictionary may enable certain options and rules that the 90 day dictionary does not include. The concept of Import and Target dictionaries are shown in FIG. 19, where an import dictionary may be imported from another OrgUnit, for example, or from a remote location. A target dictionary may represent potential dictionaries applicable to the specific debt portfolio and may apply only to that debt portfolio.

Figure 20:
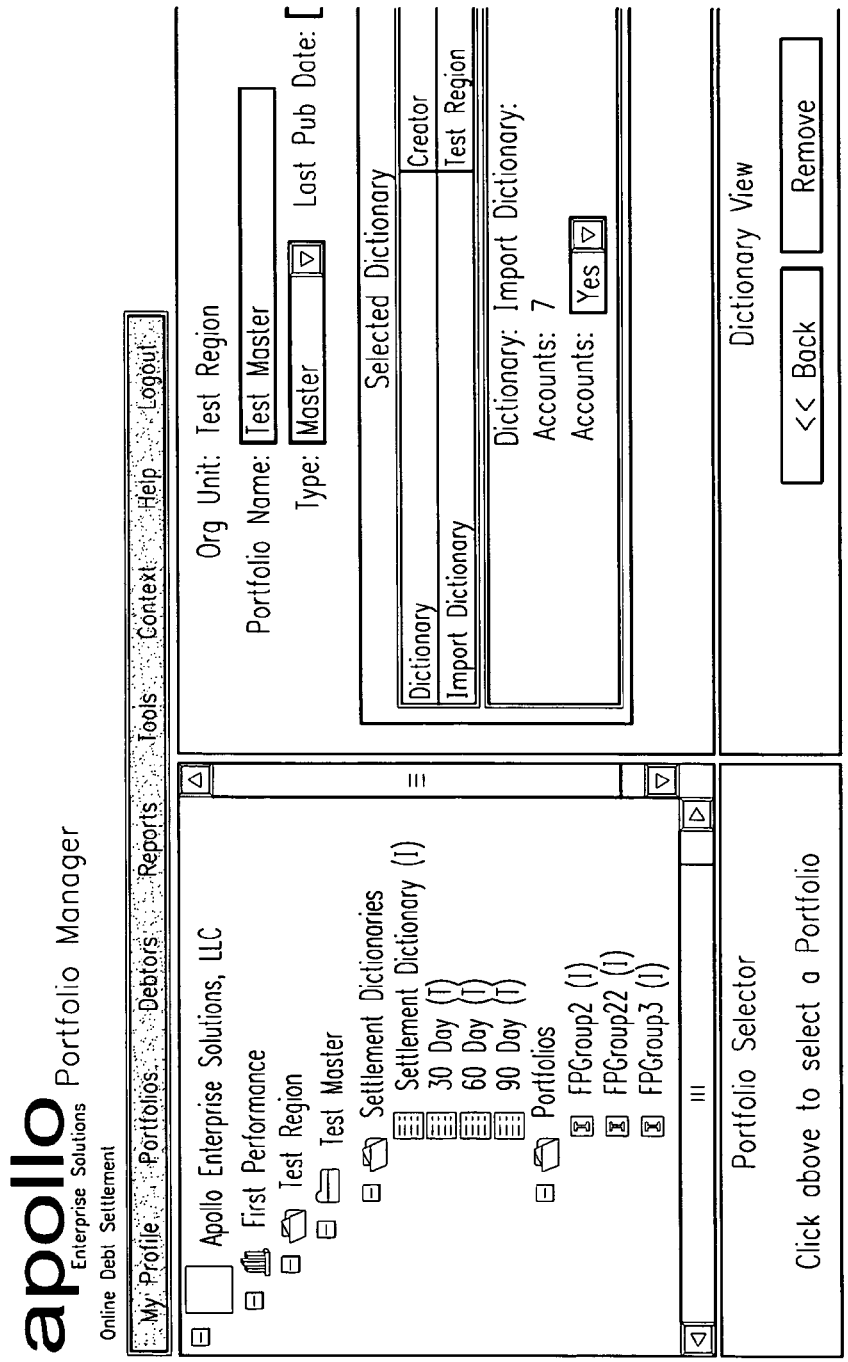
FIG. 20 is a screen shot of a selected dictionary including attributes.

FIG. 20 shows a selected dictionary, here the import dictionary, and its attributes, namely that it is shared by seven accounts and may be set as exclusive to this portfolio. If the dictionary is set exclusive, aspects may be changed for this dictionary and not applied to the other six accounts.

Figure 21:
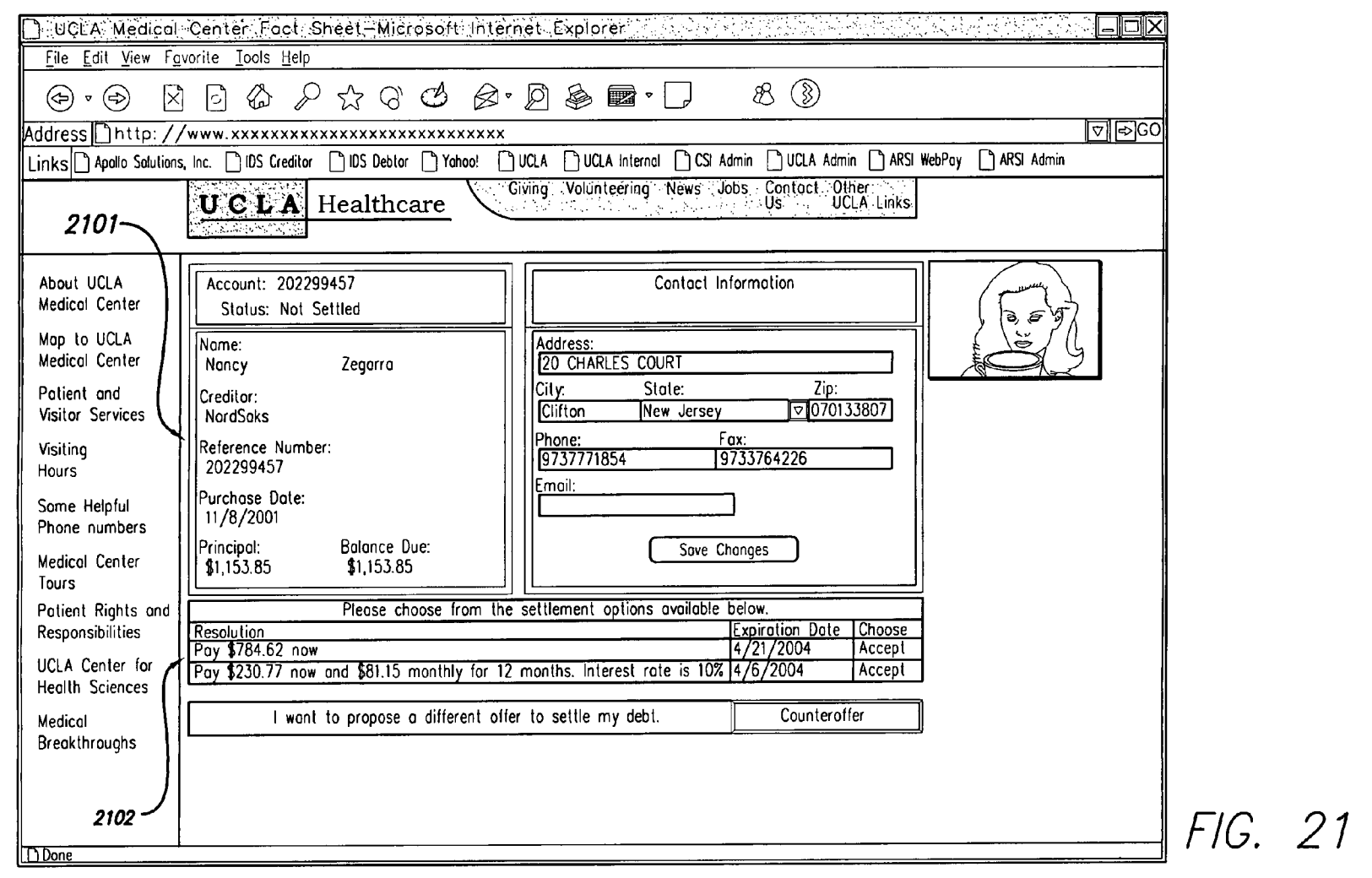

FIG. 21 illustrates a screen shot 2101 viewable by a debtor/user. The individual's name is presented here, as is the creditor, reference number, purchase date, principal, contact information (with options to update the information) and notably two options for settlement. In this view, the balance due is $1153.85, and the transaction resolution offer set includes an offer to pay $84.62 now, expiration date Apr. 21, 2004, or pay $230.77 now and $81.15 monthly for 12 months, interest rate of 10 percent. The second offer in the offer set expires on Apr. 6, 2004. The user may accept either offer in the offer set, or may select an option to submit her own offer for consideration. Again, this offer to enable the user to submit an offer depends on the rules established for the creditor, credit agency, debtor, and transaction to be resolved.

Figure 22:
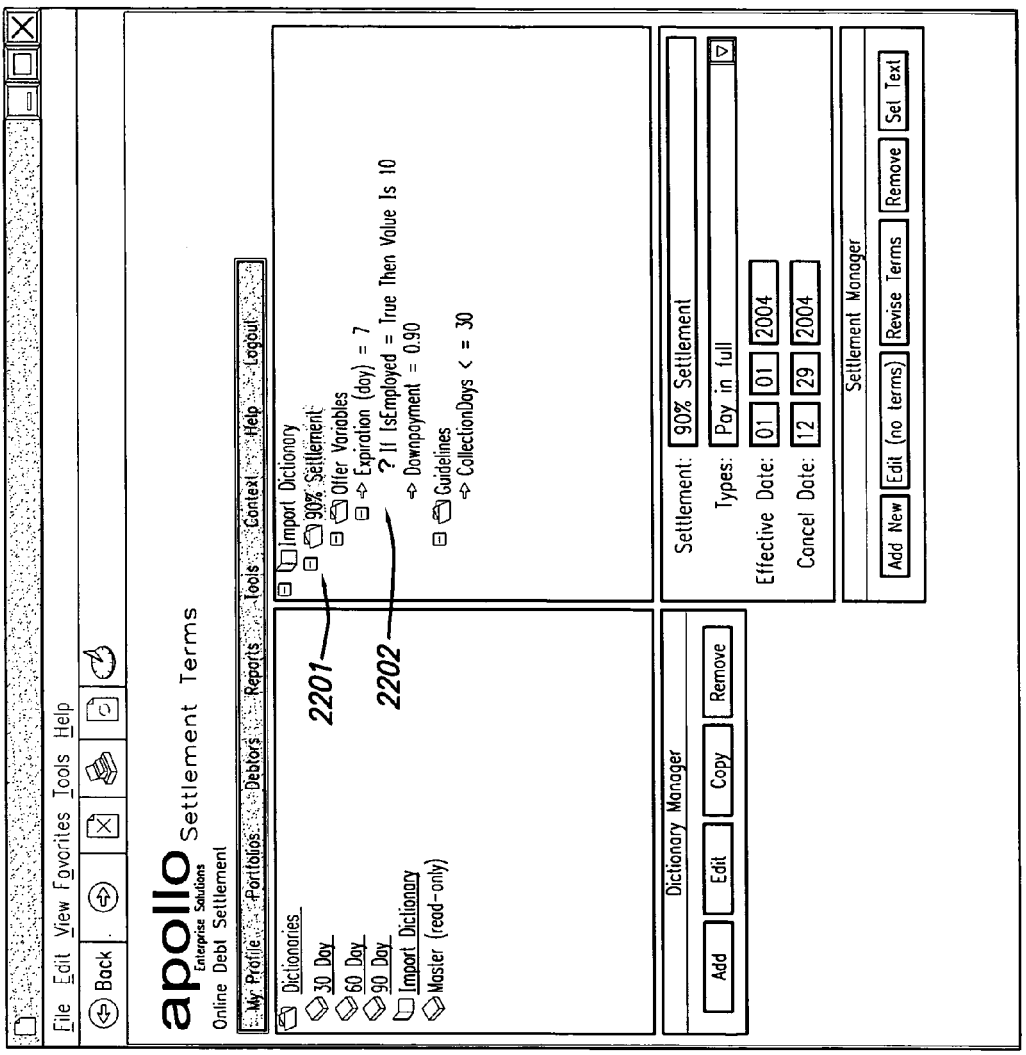
FIG. 22 is an alternate embodiment of the use of settlement terms, including rules, used to form offers to debtors for the embodiment presented.

A second screen shot of settlement terms is presented in FIG. 22. From FIG. 22, offer variables and guidelines, each a different set of rules, are presented. The offer is simply one of 90 percent settlement 2201. The requirements in this instance are if the user/debtor is employed, then Value is set equal to 10, and the Downpayment is equal to 90, a 90 percent settlement, at point 2202. Guidelines establish that the number of days to collect is less than 30, meaning the 90 percent must be collected within 30 days. Note that the 90 percent offer expires at 7 days. Effective dates and cancellation dates are provided. This version may be presented to either a creditor or the entity maintaining the server, and terms may be entered and/or changed as desired.

Alternate Transaction Resolution Scenarios

While the foregoing generally discusses resolving transactions with respect to a specific debt settlement scenario, the invention is not so limiting. In particular, the present system may be employed, including the rules, schemas, dictionaries, modules, servers, and components to resolve other types of transactions.

For example, the present system and general methodology may be employed to seek and obtain charitable donations. Obtaining credit reports may or may not be practical in such a situation, but general information may be obtained about the contributor using different sources. As with the prior system, certain contributors may be provided with a web site address and may be provided with a numeric indicator, such as a contributor number. Such a contributor may have a history of contributing certain amounts to various institutions and may therefore have a profile available.

Generally, the contributor may log in to the web site maintained by a charity or group of charities using debtor device 106 and may log into server 102. The server may rely on account/transaction database 118 for information on the user/contributor. Alternately, if external information may be obtained on the user/contributor from an external source, such as a credit bureau, database containing personal data, or internet source, such a source may be utilized to augment the profile of the individual. The user/contributor may be asked to respond to certain questions, such as income level, current home address, or current business address and position. Rules may then be applied by the server as described above to develop a set of offers, where offers may include a one-time gift or a payment option, possibly including free offers with each offer. For example, if absolutely nothing is known about a contributor, and the contributor does not provide significant substantive information in response to questions, such as refusing to specify income level, a default level of participation may be provided, such as options of $25, $50, $100, $250, or $500, or payments of $25 or $50 per month for a year. However, if certain information is known, the individual may be presented with different offers. For example, if the individual earns over $150,000 per year and is known to have made contributions to the present charity of over $1000 over the past year and other charities over $1000 in the past year, this may trigger a rule. For example, if the user/contributor has contributed more than $500 but less than $2000 over the past year and has a stated annual income of over $100,000, the server 102 may present the user/contributor with options of $500, $1000, $2000, and $5000 for immediate contribution, with his/her name mentioned as a bronze, silver, gold, and platinum contributor, respectively, in an annual charity publication. The user can select one of these, or an alternative selection, where the user/contributor may enter additional information, may be provided. For example, if the user/contributor wishes to specifically contribute $1500, she may enter that amount, or may enter a desired amount of $150 per month for 12 months. Subsequent rules may come into play, but generally the amount contributed may be accepted and the transaction resolved. Payment may be made as stated previously, where the charity stands in the place of the creditor in the foregoing description. Note that certain modules in the embodiment of FIG. 2 may be unnecessary or have different functionality. If a credit bureau is not contacted but the accounts database 118 or other charity relevant database is contacted, credit bureau module 202 and parser module 204 seeks the information requested from the relevant data source and may parse the information obtained. Further, a portfolio manager 220 in this instance may be a charitable contribution manager, enabling contributions to be allocated to appropriate recipients according to predetermined rules.

An alternate example is a settlement of an insurance claim. In the present system 100, the user may be an individual or entity having a claim or rights to a claim, or appropriate representative, called here the claimant. The user/claimant may log into the server 102, and the server may be connected to, for example, a credit bureau server 116 and account/transaction database 118 or other external database or source of data. In this scenario, the account database may include previous settlement offers made to the user/claimant, financial information about the claimant obtained from legal sources, severity of the injury/accident, or other relevant information. Based on the information available, as well as any history of claims paid for similar claims typically available in account/transaction database 118, the server may prepare a set of insurance settlement offers according to rules established by the insurer. For example, if the injury is a death of a person with no immediate family, aged 58, caused by a car accident, the claimant may be offered $500,000 now, or $30,000 per year for 20 years, or $25,000 per year for 30 years. According to the rules presented by the insurer, the claimant may be entitled to accept the settlement or may provide alternate terms. The aspects of the current design dealing with payment (ETF, credit card payments, etc.) would typically not be required, but once the transaction is resolved according to the rules provided and the agreement obtained, the payment may be authorized and paid by a third party or by the creditor as appropriate. The information regarding resolution, such as the fact that the claim has been settled and the portfolio of claims and reports, may be generated where appropriate.

Future Pay

The system 100 may be employed, including the rules, schemas, dictionaries, modules, servers, and components to resolve other types of transactions using a future pay or future payment arrangement. As used herein, the term "future pay" or "future payment" refers to the ability of a debtor or a third party to make payments according to a desired schedule rather than an established regular schedule of applying payments. In essence, future payment provides the debtor with the ability to interact with the present system to modify existing debt terms "on-the-fly" and submit future payment requests for acceptance and scheduling approval.

In general, the present system and method may be employed to receive additional payments from a debtor for application against an outstanding debt or principal balance. In this arrangement the debtor or a third party proactively engages in altering the existing debt terms. In one example, called here "schedule adjustment," a debtor may have an outstanding debt named 'first_loan' of $500.00 due immediately, and may desire to investigate whether he can spread this debt out into a number of smaller payments due at a predefined schedule. A second example may include a user having certain funds available, such as a windfall, where the user wishes to apply the funds to specific payments due. For example, assuming $100 monthly payments are due, a user receiving a $700 tax refund in May may wish to apply the tax refund against seven upcoming payments, such as June through December. A third example is a parent wishing to pay a child's debt, such as a car loan, while the child is away at college. Another example is a debtor who wishes to make payments for specific time periods, such as payments covering the months of December and January to minimize bills due around the holidays. An additional example is a situation where a creditor finds that a user has encountered a catastrophic or materially disruptive occurrence with respect to making payments, such as a flood, earthquake, or other natural disaster, or long term admittance to a hospital, or loss of a job. If the creditor is so inclined, the creditor may provide the debtor with debt relief for a specified number of payments, as long as such relief is legally acceptable. For example, providing debt relief with a usurious rate for the unpaid balance is unacceptable.

Figure 23:
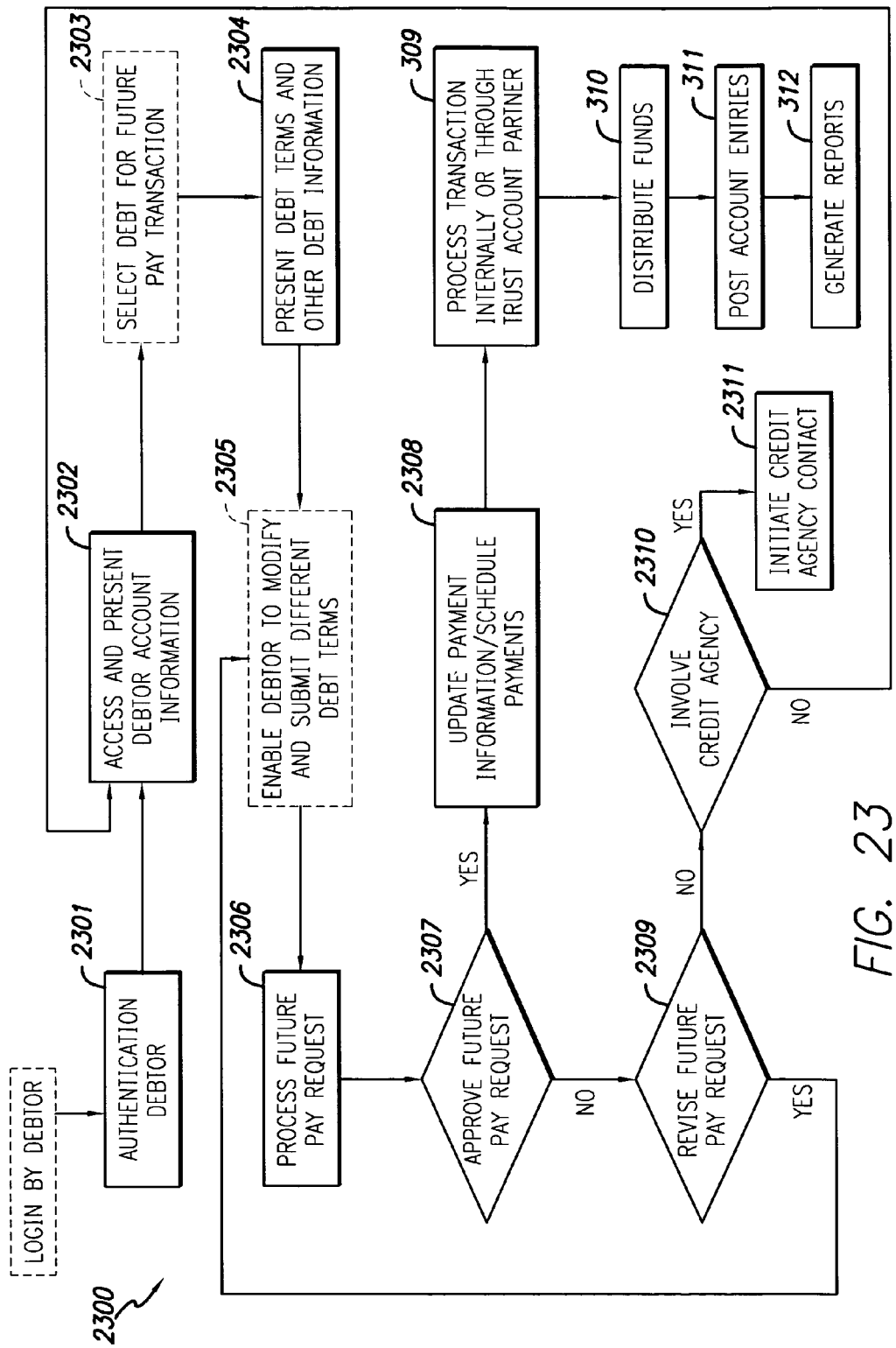
FIG. 23 illustrates a process flow for future payment debt collection in accordance with one embodiment of the present design.

FIG. 23 illustrates a general process flow for future payment request transaction processing. A debtor desiring to initiate a future payment request initially logs onto, for example, a web site hosted by server 102 and provides their access control information for authentication. Alternately, a third party wishing to satisfy a debt may log in and be authenticated in various ways. For example, a list of acceptable third parties may be provided by the user, or a set of acceptable third parties may be provided by the creditor, including sets of acceptable third parties, such as family members. If a general class of third parties is provided, that class must be authenticated, i.e. by either providing passwords, specific information, or by other reasonable third party authentication means, discussed in more detail below. At worst, the third party may be informed that access is withheld pending approval by the user, where the user may be informed of the third party request to make a payment in some manner, such as via email or regular mail.

From FIG. 23, at point 2301, server 102 may execute software 112 to process the logon attempt, such as of the debtor or third party, and upon successful authentication, may provide access to server 102. The depicted authentication mechanism executes in accordance with and in the same manner as described previously for system 100 via user/debtor interface 222. Once granting account access, the software 112 may enable the debtor to navigate web pages or screens as provided by the user/debtor interface 222 to access his account. As may be appreciated, access for a user may be significantly greater than access for a third party, who may only be able to contact a payment screen or other limited system functionality. The debtor may access her accounts by making a request for all active account information. A third party may request available debt information for a user. Server 102 may access the account/transaction database 118 to accommodate such a request and can return current account information for presentation on a web page. At point 2302, the server 102 presents all accounts or debt instruments and relevant account information to the debtor or approved third party.

The webpage server 102 may also provide, at point 2302, for example, an icon or button for the debtor or approved third party to actuate or select indicating a desire to submit a future payment request. Such a future payment request may constitute an attempt to renegotiate existing debt terms (e.g. established regular schedule of payments) with the credit entity. Terms regulating such a negotiation may be specified by the creditor or credit agency and/or entity, such as by a set of rules, schemas, or definitions, and a limited range of acceptable modifications may be provided. For example, a creditor may not wish to offer an ability to allow future payment of certain debts. If this is the case, then icon or button will be unavailable for the user/debtor or third party to select for the given account.

If future payment is available, server 102 may generate and provide to user/debtor device 106 a menu for presentation that may contain one or more active debts and place an icon or button next to each account or represented debt instrument to indicate those available for future payment transactions. At point 2303, the user/debtor or third party may select the appropriate or desired account by actuating the associated future payment icon or button to initiating a future payment transaction. Once an account is selected for future payment, the decision engine 206 may access the account/transaction database 118 to obtain debtor information regarding the selected debt. The decision engine 206 obtains and presents relevant debt terms and other debt information describing the contractual loan agreement to the user/debtor via the user/debtor interface 222 at point 2304. Continuing the example, information returned by the present system for presentation to the user/debtor may include: account entitled 'first_loan', total payment amount due '$500.00', amount outstanding '$2875.00' and payment due date 'immediate'. The decision engine 206 may provide the contractual agreement debt terms and account information in a manner sufficient to allow the user/debtor to edit or modify these terms in order to 'renegotiate' his debt.

The present design can include payment term adjustments or specific payment alterations made by the system for any unscheduled payments accepted by the creditor or alternately by a third party escrow party or agent. In the situation of a creditor or credit agency accepting payment, the system generally presents the existing payment plan and shows the available alterations, either generally or specifically, that can be made by the user as approved by the creditor. For example, specific monthly payments may be made in advance if offered, or alternately, general propositions can be presented to the user, such as only specific designated payments can be made (no partial payments). If a third party escrow agent is employed, the user makes the payment arrangement according to acceptable rules for the escrow agent, and the escrow agent can apply the payments as designated by the user. For example, if the user wishes to make six payments of $400 over the next six months and then apply $250 to her December payment, the escrow agent notes these instructions and makes the payments to the creditor or credit agency according to the schedule, typically for a fee.

Future payment enables the user/debtor to set or modify terms according to his or her desires, and the system makes available to the user/debtor various appropriate fields, such as an HTML web page having data entry fields, for data such as amount debtor is willing to pay per month over a fix interval or duration (e.g. 12 months), interest rate desired, repayment term desired, months or period when payments are to be applied, and so forth.

Edits and modifications may be supported by enabling the debtor to alter entries within displayed fields, presented by user/debtor device 106, showing the various loan parameters as supplied by decision engine 206 at point 2305. Parameters available for modification may include, but are not limited to, total amount due or outstanding, next payment due date or payment interval, scheduled payment amount, and other loan governing information. The user/debtor reviews the debt terms and information presented and may interactively modify the debt terms by editing displayed fields containing parameters relating details of the debt. The user/debtor enters his changes to modify these parameters at point 2305 to represent their desired payment schedule for consideration as a future payment request.

As an example, the debtor may be facing a $4000 remaining debt. The user may have an agreement in place to pay $250 per month for the next 20 months, but may have recently inherited funds and wishes to make the next 10 payments immediately. The debtor may achieve this goal by logging onto the system and editing certain displayed parameters. For example, the months may be presented to the user (April, May, June, etc.) together with the amount due ($250 in each month), where the monthly amount due is an editable field. The user may edit the April field from "$250" to "$2500" and the May, June, July, August, September, October, November, December, and January payments to "$0." Once all changes are entered, the user/debtor may submit the modified debt terms for consideration and approval at point 2305. Server 102, executing software 112, may process the user/debtor's future payment request at point 2306. Future payment request processing may entail consulting decision engine 206, which in turn may access and employ the dictionary 214, schemas 216, creditor decision criteria 212, and other information stored in account/transaction database 118.

The response from system 100, specifically server 102, depends on the rules established for the particular debt, such as established by the creditor or credit agency, including those established for future payment transactions. The decision engine 206 may evaluate or process the future payment request offer with the assistance of the modules of FIG. 2 to determine an appropriate response for the future payment request made.

Note that the breakdown between the amount of principal and interest may be presented or spelled out on screen for the user. If the creditor or credit agency allows the user to pay down principal with no effect on interest, i.e. interest is still due, that may be reflected. If payment of principal is allowed to decrease the amount due on existing or future interest payments, that may be reflected to the user on screen. If payment of only full principal due with computed interest for a future payment is allowed, the user can make a payment accordingly.

An alternate example would be using an escrow arrangement, where an adult of a minor child wishes to pay off her debt for non-summer months while the child is in school. The parent logs on and is authenticated by the system, and the parent is then presented with a screen including the debt of the child. For example, the child may have $9500 outstanding on a car loan or other debt, payable for $232.50 every month for the next 45 months. A parent with $5000.00 may wish to pay September, October, November, December, January, February, March, April, and May payments immediately. In this case, if the creditor has only enabled payment of a full principal plus interest payment to be made ahead of time, the parent-user can indicate $5000. is being put toward the instant payment and various monthly payments, i.e. non-summer monthly payments, can be set to zero. Depending on the desires of the system administrator and the creditor, the user can be prompted by an easy user interface to allocate upfront payments to specific future payments, or boxes can be checked to decrease payments. Additionally, partial payments can be made—for example, a parent may want to pay $100.00 of a $175.50 payment, leaving $75.50 to be paid by a child. Other third parties may contribute, as the present design is not limited to one or two people allocating funds to pay down debts of a user/debtor. Again, depending on the rules, schemas, and desires of the creditor/credit agency and/or entity operating the system, multiple payments may be allocated by different entities. For example, for a $600 payment or debt, one entity may bay $100, another $117.04, another $200, and the user/debtor the remainder. The user-debtor may subsequently make all or part of the scheduled payment based on the rules established and the funds allocated.

The paying user or paying entity, including the user/debtor, may be offered an ability to use an escrow entity, whereby the escrow entity holds the funds for the user and makes the payments as dictated by the user. For example, the user may want to make six months payment in advance and may provide six payments during an online session. The user may then be directed to a payment screen and may make the payment accordingly. The payment made would not be provided to the creditor/credit agency at that time, but instead to a third party escrow agent, typically with the knowledge of the user and a payment in some form to the escrow agent. The escrow agent then holds the amount paid in escrow and applies the funds per the schedule requested to the creditor/credit agency at the time or date required. Such a service relieves the user of any responsibility to make payments by the prescribed dates, i.e. by March 15, or September 1, etc. That responsibility is transferred to the escrow agent. The user remains responsible for those payments not accorded to the third party escrow agent.

In operation, once the user has entered payment information on the system, i.e. set up the payments for which the current funds are to be applied and arrange the payment such as by credit card, bank debit, etc., server 102 may indicate the future payment request offer made by the user/debtor is acceptable to the credit entity based on the rules provided. If the future payment request is acceptable to the creditor, server 102 may generate and return an approval message for presentation to the user/debtor at point 2307. The system may further solicit input as to whether the user/debtor would like to continue by making a payment. At point 2308, server 102 may update payment information to represent the new or newly negotiated debt terms, including but not limited to the payment schedule.

If the user/debtor indicates that he does wish to make a payment transaction for the specific debt account, server 102 may transfer the user/debtor to a payment partner server that may supply functions such as ACH (automated clearing house) processing, funds clearing and disbursement services to creditors/clients or may process the transaction internally at point 309 as previously described. The third party payment partner may act as the escrow agent and may receive funds on behalf of clients, such as banks, credit grantors and collection agencies, and in this example can hold and/or clears payment 1 for $50.00 against account 'first_loan.' Funds may be distributed at point 310, account entries may be posted at point 311, and reports may be generated at point 312 sufficient to complete this future payment request and payment as previously described.

The user request may be denied. In the case discussed, denial of a request may occur while processing the request, where decision engine 206 encounters either a rule or other account information that indicates, for example, the life of 'first_loan' may not exceed six months in duration. Server 102 may generate and return a rejection or a future payment request denied message to the user/debtor at point 2307. When denied, the server 102 may seek information as to whether the user/debtor would like to present an alternate future payment request and continue by revising the initial future payment request debt term modifications at point 2309.

If the user/debtor desires to make an alternate future payment request, server 102 returns to point 2305 and software 112 may process this alternate future payment request. Continuing on with this example, the user/debtor desires to present an alternative future payment request consisting of $250.00 paid immediately and $50.00 per month for a period of 5 months in order to satisfy her debt agreement. Again, the user/debtor may achieve this by editing the appropriate displayed parameters to revise or modify the payment scheme and submits changes for approval at point 2305. Server 102 may process this alternate future payment request at point 2306 and may generate an approval message at point 2307, since this request meets the loan life duration limit of six months and satisfies the outstanding principal. The system may then inquire whether the user/debtor wishes to continue by making a payment. At point 2308, server 102 may update payment information to represent the newly negotiated and approved debt terms, including but not limited to the payment schedule.

If the user/debtor indicates that he does wish to make a payment transaction for this debt account, server 102 may transfer the user/debtor to processing controlled by a payment partner server or escrow agent that may supply functions such as ACH (automated clearing house) processing, funds clearing and disbursement services to creditors/clients, or may process the transaction internally at point 309. The third party payment partner/escrow agent receives funds on behalf of clients, such as banks, credit grantors and collection agencies, and in this example holds and/or clears payment 1 for $300.00 (representing $250.00 due immediately plus $50.00 for the first monthly installment) against account 'first_loan.' At this stage, funds may be distributed at point 310, account entries may be posted at point 311, and reports may be generated at point 312 sufficient to complete this future payment request and payment transaction.

At a certain point the user/debtor may be unable to submit a future payment request offer suitable for approval within the existing terms of the debt agreement and associated rules represented within system 100. The user/debtor may ask for the credit entity to review his account at point 2310. Credit entity involvement may include a response that presents the user/debtor with a contact name and telephone number sufficient to reach the credit agency by voice at point 2311, or may send an electronic message to the credit agency requesting an account review. The account review may result in the credit entity modifying rules or other account information to enable the future payment request to proceed and grant approval. Moreover, if the credit agency elects to modify the associated rules and/or other account information, the credit agency may generate one or more potential transaction settlement options that do meet the newly modified rules and decision criteria associated with the debt agreement revised by the credit entity in accordance with the present system.

At point 2311, the present design may generate and present options to the user/debtor via the user/debtor interface 222 the next time he accesses server 102. If the user/debtor selects to not involve the credit agency, server 102 returns the user/debtor to the debtor account information web page generated at point 2302.

As another example, the present system may present to the user/debtor, at point 2304, a debt account name 'second_loan,' total amount due '$1,200.00,' payment cycle 'monthly,' payment amount due '$50.00,' and total number of payments '24.' In this example, the user/debtor has lost her job due to a natural disaster (e.g. hurricane) affecting a wide geographical area. Due to this disaster, the creditor may decide to provide relief to affected debtors and may introduce a new or modified rule set (not shown in FIG. 23) that may enable affected debtors to delay or defer payments for a period of 6 months with no additional interest or penalties. Similarly, the same creditor may introduce another rule that enables affected debtors to delay or defer payments for a period of 12 months with additional interest of 1% and a penalty of $100.00.

Upon successful authentication, user/debtor interface 222 may present debtor account information at point 2302 via a web page as previously described. The user/debtor may select the future payment icon or button for account 'second_loan' from the web page at point 2303 initiating a future payment transaction. Decision engine 206 may access the account/transaction database 118 to obtain appropriate debtor information regarding the 'second_loan' debt. The decision engine 206 may return obtained information for presentation to the user/debtor via the user/debtor interface 222 at point 2304. At this point the user/debtor may interactively modify the 'second_loan' debt terms by editing displayed fields containing parameters relating details of the debt at point 2305. In this example, the debtor desires to defer payment for 5 months, due to job loss, and then begins to pay $50.00 per month for a period of 24 months in order to satisfy her debt agreement.

The debtor may achieve this by editing the following displayed parameters: defer payment from '0 months' to '5 months' to revise or modify their payment scheme. After entering this change, the user/debtor submits the modified debt terms for processing and approval at point 2305. Server 102, executing software 112, may process the user/debtor's future payment request at point 2306. Future payment request processing may include decision engine 206, which in turn may access and employ the dictionary 214, schemas 216, creditor decision criteria 212, and other information stored in account/transaction database 118. The response from system 100, specifically server 102, are appropriate for the available and set rules and schemas, including those rules established for future payment transactions. The decision engine 206 may evaluate or process the future payment request offer with the assistance of the modules of FIG. 2 to determine a response.

Server 102 may indicate the future payment request offer made by the user/debtor is acceptable to the credit entity based on the rules provided. If the future payment request is acceptable, server 102 may generate and return an approval message for presentation to the user/debtor at point 2307 and may solicit if the user/debtor would like to continue by making a payment. Server 102 may update payment information to represent the newly negotiated debt terms, including but not limited to the payment schedule at point 2308. In this example, since the debtor desires to defer any payment for five months, the user/debtor indicates that he does not wish to make a payment transaction for this debt account and subsequently logs off server 102 having successfully renegotiated debt terms for account 'second_loan'.

In a further example, if user/debtor submits a future payment request indicating an 18-month deferral of all 'second_loan' payments at point 2305, server 102 may process and deny the request since the desired deferral duration exceeds the 12 months limit rule for payment deferral. At this point, server 102 may return a future payment request rejection or denial message to the user/debtor at point 2307. In addition, server 102 may solicit if the user/debtor would like to continue by submitting an alternate future payment request at point 2309. The user/debtor may wish to present an alternative future payment request of deferring payment for 10 months and then begin to pay $50.00 per month for a period of 24 months in order to satisfy the debt agreement. Server 102 returns the debtor to point 2305 enabling the user/debtor to edit and submit an alternate future payment request. Again, the user/debtor can edit the appropriate displayed parameters to revise or modify the payment scheme and submit changes for an approval at point 2305. The decision engine 206 may process this alternate future payment request at point 2306 and may return an approval message at point 2307 when this request meets all associated loan rules. Moreover, in this example the present design calculates and returns a new payment schedule that includes a 1% increase in interest and a $100.00 deferred payment penalty as required by the rules or other account governing information.

Server 102 may present the new payment schedule at point 2308 and may enable the user to make a payment. In this example, since the debtor desires to defer any payment for 10 months, the user/debtor indicates he does not wish to make a payment transaction for this debt account and subsequently logs off server 102 having successfully renegotiated their debt terms for account 'second_loan.'

Furthermore, if the user/debtor is unable to present a future payment request suitable for approval within the existing terms, the user/debtor may ask to involve the creditor to review the account at point 2310.

In a third example, a third party outside of the loan agreement and unknown to the credit agency, including but not limited to a family member, relative, or business partner desires to make a payment using future payment on behalf of a debtor. Typically, the third party may contact the debtor in some fashion to obtain access to the system and more specifically to the debtor's accounts or account to which the third party intends to provide or apply an additional payment. The debtor may enable account access for the third party by accessing and authenticating with server 102 and adding the individual to his account access control list or some other supported access control mechanism. Once added to the access control list, the individual may log into the system using standard, typically secure Internet protocols, such as by the user/debtor logging into the web site, essentially connecting the individual with the system 100 via the user/debtor interface 222.

The third party may be presented with a series of identification questions, establishing the individual's identity including but not limited to providing a social security number, answering questions that collectively only the correct individual might know in accordance with the system 100 authentication mechanism previously described. Alternatively, the debtor may provide the third party with a code or password, and the individual may be asked to provide that code in addition to answering other pertinent identification questions. Server 102 may identify the third party to a satisfactory degree, where satisfactory is determined by the situation and the desire of the credit agency or entity controlling or maintaining server 102. Furthermore, the third party external to the loan may contact the credit agency, if for example known to or by the debtor, in some fashion to obtain access to the present system and more specifically to the debtor's accounts or account. Again, limited functionality and information would be provided to the third party, but in this situation the third party desires to provide or apply an additional payment by having the credit agency add the individual to the access control list. The method and system for adding third parties to an access control list is generally understood by those skilled in the art.

Once the third party successfully authenticates and accesses the system, server 102 may present the debtor account information to the third party at point 2302. At this point, the third party assumes a similar role to that of the user/debtor, again with limited information and/or functionality in most cases, and the third party may interact with server 102 in a manner consistent with that previously presented for the user/debtor.

In this example, the individual desires to pay $1000.00 against the outstanding principle remaining for account 'second_loan'. At point 2303, the individual selects the 'second_loan' account by actuating the associated future payment icon or button to initiate a future payment transaction. Once an account is selected for future payment, the decision engine 206 may access the account/transaction database 118 to obtain appropriate debtor information regarding the selected debt. The decision engine 206 may obtain and present relevant debt terms and other debt information describing the contractual agreement to the third party via the user/debtor interface 222 at point 2304. Continuing with this example, the information returned by the present system for presentation to the individual may include account name 'second_loan', total amount due $1,200.00°, payment cycle 'monthly', payment amount due '$50.00' and total number of payments '24' at point 2304.

The decision engine 206 may provide the contractual agreement debt terms and information in a manner sufficient to allow the third party to edit or modify these terms in order to renegotiate or modify the debt. The third party can view the debt terms and information presented and may interactively modify the debt terms by editing displayed fields containing parameters relating details of the debt. The third party may enter changes to modify these parameters at point 2305 to represent the desired payment schedule for consideration as a future payment request. In this example, the third party desires to pay $1000.00 immediately, to be applied against the outstanding principal remaining on 'second_loan'.

The individual edits the following displayed parameters: payment amount from '$50.00' to '$1000.00' and payment interval from 'monthly' to 'immediate' to indicate their revised or modified payment scheme. Once all changes are entered, the third party may submit the modified debt terms for processing and approval at point 2305. Server 102, executing software 112, may process the individual's future payment request at point 2306. Future payment request processing may include decision engine 206, which in turn may access and employ the dictionary 214, schemas 216, creditor decision criteria 212, and other information stored in account/transaction database 118. If the future payment request is acceptable, server 102 may generate and return an approval message for presentation to the third party at point 2307 and may solicit if the third party would like to continue by making a payment on the debtor's account.

Server 102 may update payment information to reflect the results of additional payment outside of the original loan agreement, including any revised negotiated debt terms, including but not limited to the payment schedule at point 2308. In this example, server 102 modifies the number of payments from '24' to '4' reflecting the third party's payment.

In this example, the third party indicates he does wish to make a payment transaction for this debt account, server 102 may transfer the third party to a payment partner server or may process the transaction internally at point 309 in accordance with the present design as previously described. The third party payment partner receives funds on behalf of clients, such as banks, credit grantors and collection agencies, and in this example holds and/or clears payment 1 for $1000.00 against account 'second_loan' in accordance with the present design. At this stage, funds may be distributed at point 310, account entries may be posted at point 311, and reports may be generated at point 312 sufficient to complete this future payment request and payment in accordance with the present design. In addition, the server 102 may send a message to the user/debtor to indicate that a payment has been made against their 'second_loan' debt and present updated payment information and schedule of payments for their consideration.

The user/debtor or authorized third party may receive counteroffers to the proposed future payment arrangement as provided by the rules and in a manner as described herein, whereupon the user/debtor or third party may accept the counteroffer or apply further information or revised information to the server 102.

While primarily described herein with respect to an exemplary system and method for future payment transactions in a debt settlement scenario, the invention and disclosure herein are not intended to be so limited. As noted, the present design may be employed in a variety of scenarios, further including but not limited to future payment of other instruments, such as contractual obligations, payroll obligations, and so forth.

Note that while certain future payment examples are provided herein, these examples are meant to be illustrative and not limiting as to the functionality of the present system and method. Other examples and implementations are possible and this document should not be limited by the examples presented. Other examples of future payment transactions may be realized using the current design.

By the foregoing description, an improved system and method for future payment transactions have been described. The improved system and method may be substantially or completely internet based such that the user can access the settlement server to resolve transactions, such as manage debt, from a platform providing, for example, Internet browsing capabilities.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A method for implementing a future payment transaction for payments owed, comprising:

providing a user with an ability to submit a future payment request to a server arrangement, wherein the future payment request comprises a request to pay money ahead of schedule for at least a portion of any scheduled payment selectable by the user representing money owed at a future date, wherein the user is provided with an ability to submit the future payment request for an out-of-sequence scheduled payment using an acceptable set of payment alteration options approved by a party owed money by the user;

processing said future payment request at the server arrangement, wherein the server arrangement is configured to evaluate the future payment request by the user and, when acceptable, provide a decision comprising approval of the future payment request, and when unacceptable, provide the decision comprising denial of the future payment request;

presenting the decision to the user; and offering the user an ability to submit an alternate future payment request according to the acceptable set of payment alteration options when the future payment request is unacceptable, and processing each alternate future payment request at the server arrangement;

wherein processing the future payment request at the server arrangement comprises comparing the future payment request against rules available to the server arrangement established for the party owed money by the user, and when such comparing indicates the future payment request is unacceptable, providing the denial of the future payment request.

2. The method of claim 1, wherein the processing at the server arrangement comprises determining the acceptability of receiving a future payment from any user.

3. The method of claim 1, wherein the user comprises a debtor and payments owed comprise a debt owed by the debtor.

4. The method of claim 1, further comprising processing the future payment request according to rules established by a credit entity having rights to the debt.

5. The method of claim 4, wherein the rules consider the user's ability to satisfy the future payment request.

6. The method of claim 4, further comprising generating and presenting to the user at least one payment option representing an approved future payment transaction.

7. A method for enabling a future payment transaction, comprising:

enabling submission of a future payment request to a server arrangement, wherein the future payment request comprises a request to pay money ahead of schedule for at least a portion of any scheduled payment selectable by a user, wherein the user is provided with an ability to submit the future payment request for an out-of-sequence scheduled payment without submitting a corresponding payment request for an in-sequence scheduled payment using an acceptable set of payment alteration options approved by a party owed money by the user;

processing said future payment request at the server arrangement and, when acceptable, providing a decision comprising approval of the future payment request, and when unacceptable, providing the decision comprising denial of the future payment request;

presenting the decision from the server arrangement to the user; and offering the user an ability to submit an alternate future payment request according to the acceptable set of payment alteration options when the future payment request is unacceptable;

wherein processing the future payment request at the server arrangement comprises comparing the future payment request against rules available to the server arrangement established for the party owed money by the user, and when such comparing indicates the future payment request is unacceptable, providing the denial of the future payment request.

8. The method of claim 7, wherein the processing at the server arrangement comprises determining the acceptability of receiving a future payment from any user.

9. The method of claim 7, wherein the user comprises a debtor and payments owed comprise a debt owed by the debtor.

10. The method of claim 7, further comprising processing the future payment request according to rules established by a credit entity having rights to the debt.

11. The method of claim 10, wherein the rules consider the user's ability to satisfy the future payment request.

12. The method of claim 10, further comprising generating and presenting to the user at least one payment option representing an approved future payment transaction.

13. A method for facilitating a user's future payment transaction, comprising:

enabling the user to submit a future payment request to a server arrangement, wherein the future payment request comprises a request to make at least one immediate payment, wherein the user is provided with an ability to submit the future payment request for an out-of-sequence scheduled payment without submitting a corresponding payment request for an in-sequence scheduled payment using an acceptable set of payment alteration options approved by a party owed money by the user;

processing said future payment request at the server arrangement and, when acceptable, providing a decision comprising approval of the future payment request, and when unacceptable, providing the decision comprising denial of the future payment request;

transmitting the decision from the server arrangement to the user; and offering the user an ability to submit an alternate future payment request according to the acceptable set of payment alteration options when the future payment request is unacceptable;

wherein processing the future payment request at the server arrangement comprises comparing the future payment request against rules available to the server arrangement established for a party owed money by the user, and when such comparing indicates the future payment request is unacceptable, providing the denial of the future payment request.

14. The method of claim 13, wherein the processing at the server arrangement comprises determining the acceptability of receiving a future payment from any user.

15. The method of claim 13, wherein the user comprises a debtor and payments owed comprise a debt owed by the debtor.

16. The method of claim 13, further comprising processing the future payment request according to rules established by a credit entity having rights to the debt.

17. The method of claim 16, wherein the rules consider the user's ability to satisfy the future payment request.

18. The method of claim 16, further comprising generating and presenting to the user at least one payment option representing an approved future payment transaction.

* * * * *